(12) United States Patent
Miyaoka et al.

(10) Patent No.: US 8,381,158 B2
(45) Date of Patent: Feb. 19, 2013

(54) VERIFICATION COMPUTER PRODUCT, METHOD, AND APPARATUS

(75) Inventors: Hiroki Miyaoka, Yokohama (JP); Seiichiro Yamaguchi, Yokohama (JP); Tsuyoshi Sakata, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 29 days.

(21) Appl. No.: 13/020,615

(22) Filed: Feb. 3, 2011

(65) Prior Publication Data
US 2011/0202895 A1 Aug. 18, 2011

(30) Foreign Application Priority Data
Feb. 17, 2010 (JP) .................................. 2010-033014

(51) Int. Cl.
*G06F 17/50* (2006.01)
*G06F 17/10* (2006.01)

(52) U.S. Cl. ........ 716/111; 716/106; 716/113; 716/115; 716/132; 716/136; 703/2; 703/13; 703/14

(58) Field of Classification Search .................. 716/106, 716/111, 132, 136, 113, 115; 703/13, 14, 703/2
See application file for complete search history.

(56) References Cited

U.S. PATENT DOCUMENTS

| | | | | |
|---|---|---|---|---|
| 5,761,076 A | * | 6/1998 | Miki | ............................. 716/113 |
| 6,150,894 A | * | 11/2000 | Seng et al. | ..................... 331/175 |
| 6,161,212 A | * | 12/2000 | Seely | .................. 703/2 |
| 6,408,425 B1 | * | 6/2002 | Mizutani | ....................... 716/115 |
| 6,728,941 B2 | * | 4/2004 | Chen | ............................. 716/136 |
| 6,928,626 B1 | * | 8/2005 | McGaughy et al. | .......... 716/111 |
| 7,016,820 B2 | * | 3/2006 | Kimura et al. | ..................... 703/2 |
| 7,098,510 B2 | * | 8/2006 | Kodama et al. | ............... 257/355 |

(Continued)

FOREIGN PATENT DOCUMENTS

| | | |
|---|---|---|
| JP | 2003-068756 A | 3/2003 |
| JP | 2006-119716 A | 5/2006 |

OTHER PUBLICATIONS

Yi-Pin Fang et al.; "A simple method to fabricate single electron devices"; Publication Year: 2004; Semiconductor Manufacturing Technology Workshop Proceedings, 2004; pp. 83-86.*

(Continued)

*Primary Examiner* — Helen Rossoshek
(74) *Attorney, Agent, or Firm* — Arent Fox LLP

(57) ABSTRACT

A recording medium stores a verification program that causes a computer to execute detecting from a model circuit, a first circuit representing junction of a source region and a substrate region and including a junction resistance and a junction capacitance, a second circuit parallel to the first circuit, representing junction of a drain region and the substrate region, and including a junction resistance and a junction capacitance equivalent to the junction resistance and capacitance of the first circuit, and a connection resistance connecting the circuits and a substrate electrode; calculating, using the junction resistances and connection resistance, a first coefficient indicating impact of the junction resistances and connection resistance on amplitude variation; calculating, using the junction capacitances and connection resistance, a second coefficient indicating impact of the junction capacitances and connection resistance on phase variation; correcting the junction capacitances using a sum of the coefficients; and outputting a correction result.

7 Claims, 17 Drawing Sheets

U.S. PATENT DOCUMENTS

| | | | |
|---|---|---|---|
| 7,302,378 B2* | 11/2007 | Hayashi | 703/14 |
| 7,360,191 B2* | 4/2008 | Chang et al. | 716/102 |
| 7,480,879 B2* | 1/2009 | Checka et al. | 716/115 |
| 7,549,136 B2* | 6/2009 | Tiwari | 716/106 |
| 7,631,281 B2* | 12/2009 | Kim | 716/106 |
| 7,703,050 B2* | 4/2010 | Hershenson et al. | 716/132 |
| 7,714,356 B2* | 5/2010 | Abou-Khalil et al. | 257/173 |
| 7,735,033 B2* | 6/2010 | Zhang et al. | 716/136 |
| 7,783,996 B2* | 8/2010 | Hershenson et al. | 716/115 |
| 7,792,663 B2* | 9/2010 | Ikoma et al. | 703/2 |
| 2006/0091550 A1* | 5/2006 | Shimazaki et al. | 257/758 |
| 2006/0107246 A1* | 5/2006 | Nakamura | 716/5 |
| 2009/0044158 A1* | 2/2009 | Lilja | 716/5 |

OTHER PUBLICATIONS

Lee et al.; "A self-backgating GaAs MESFET model for low-frequency anomalies"; Publication Year: 1990; Electron Devices, IEEE Transactions on; vol. 37, Issue: 10; pp. 2148-2157.*

Wenwei (Morgan) Yang, et al., BSIM4.6.2 MOSFET Model- User's Manual, Department of Electrical Engineering and Computer Sciences University of California, Dec. 11, 2009; Berkeley, CA 94720.

* cited by examiner

VERIFICATION COMPUTER PRODUCT, METHOD, AND APPARATUS

CROSS REFERENCE TO RELATED APPLICATIONS

This application is based upon and claims the benefit of priority of the prior Japanese Patent Application No. 2010-033014, filed on Feb. 17, 2010, the entire contents of which are incorporated herein by reference.

FIELD

The embodiment discussed herein is related to model circuit verification.

BACKGROUND

Model circuits used in Berkeley short-channel IGFET model (BSIM) circuit simulation are conventionally known (see, e.g., Japanese Laid-Open Patent Publication Nos. 2003-68756 and 2006-119716). In such a model circuit, a PN-junction diode formed in a metal-oxide-semiconductor field-effect transistor (MOSFET) is substituted with a current source and a capacitive element. An example will be described of the PN-junction diode formed in a MOSFET and the substitution of the PN-junction diode by a current source and a capacitive element.

FIG. 15 is an explanatory diagram of an example of a vertical structure of a conventional transistor. FIG. 15 depicts a vertical structure 1500 of an N-channel MOSFET (hereinafter, "NMOS"), and a depletion layer 111 that is formed when voltage is applied to the NMOS. The vertical structure 1500 includes a gate electrode 101, a gate insulating film 102, a source region 107, a drain region 108, a substrate 109, and device isolation regions 110.

The substrate 109 is a P-type substrate. A "substrate region" refers to the substrate 109 in the NMOS. The source region 107 is an N-type region and is formed by source regions 103 and 105, the source region 103 being deeper from the surface of the source region 107 than the source region 105. The drain region 108 is an N-type region and is formed by drain regions 104 and 106, the drain region 104 being deeper from the surface of the drain region 108 than the drain region 106.

The depletion layer 111 is formed in the vertical structure 1500. In the vertical structure 1500, PN-junction diodes are formed by the source region 107 and the substrate 109; and the drain region 108 and the substrate 109.

In the model circuit, the PN-junction diodes formed by the source region 107 and the substrate 109 are classified according to the position in the vertical structure. The PN-junction diodes formed by the source region 107 and the substrate 109 are classified into a PN-junction diode 112 on the gate electrode 101 side, a PN-junction diode 114 below the source region 107, and a PN-junction diode 116 on the device isolation region 110 side.

In the model circuit, the PN-junction diodes formed by the drain region 108 and the substrate 109 are classified into PN-junction diodes according to the position in the vertical structure. The drain-side PN-junction diodes are classified into a PN-junction diode 113 on the gate electrode 101 side, a PN-junction diode 115 below the drain region 108, and a PN-junction diode 117 on the device isolation region 110 side.

For a P-channel MOSFET (hereinafter, "PMOS"), the source region 107 and the drain region 108 are P-type regions and a well region is an N-type region. Therefore, in the PMOS, the polarity of each junction diode is the opposite polarity of the PN-junction diodes depicted in FIG. 15.

FIG. 16 is an explanatory diagram of an exemplary equivalent circuit of a conventional NMOS. In an equivalent circuit 1600, "G" denotes the gate electrode 101; "S" denotes a source electrode that is formed in contact with the source region 107; "D" denotes a drain electrode that is formed in contact with the drain region 108; and "B" denotes a substrate electrode that is formed in contact with the substrate 109.

The electrical properties of a PN-junction diode include current and capacitance (hereinafter, "junction leak" and "junction capacitance", respectively) that are determined according to the voltage between an anode and a cathode, the temperature therebetween, and shape parameters of the portion therebetween. Therefore, a PN-junction diode can be represented by junction capacitance and junction leak.

Hence, in the equivalent circuit 1600, the PN-junction diodes 112 and 113 are respectively represented by a junction capacitance $CJG_S$ and a junction leak $JLG_S$; and a junction capacitance $CJG_D$ and a junction leak $JLG_D$.

Further, in the equivalent circuit 1600, the PN-junction diodes 114 and 115 are respectively represented by a junction capacitance $CJ_S$ and a junction leak $JL_S$; and a junction capacitance $CJ_D$ and a junction leak $JL_D$.

In the equivalent circuit 1600, the PN-junction diodes 116 and 117 are respectively represented by a junction capacitance $CJSW_S$ and a junction leak $JLSW_S$; and a junction capacitance $CJSW_D$ and a junction leak $JLSW_D$. A substrate resistance Rsub in the equivalent circuit 1600 indicates, as a resistance, the difficulty for current to flow in the substrate 109.

To increase the timing yield of a semiconductor integrated circuit, it is important that delay simulation results for the circuit coincide with actual measurements. Delay in the circuit is significantly influenced by junction capacitance and therefore, accurate replication of the junction capacitance in the simulation is indispensable.

FIG. 17 is an explanatory diagram of an example concerning junction capacitance and junction leak on a gate side of a conventional equivalent circuit. In an equivalent circuit 1700, only the junction capacitances $CJG_S$ and $CJG_D$ and the junction leaks $JLG_S$ and $JLG_D$ are depicted. In the equivalent circuit 1700, a gate electrode G, a source electrode S, and a drain electrode D are grounded at a common potential; and a bias Vbs and a small-signal AC power source are disposed between a substrate electrode B and the ground. Substrate resistance Rsub is disregarded because the substrate resistance Rsub is small compared to the junction leaks $JLG_S$ and $JLG_D$.

FIG. 18 is an explanatory diagram of an example related to substituting the junction leaks with resistors in a conventional equivalent circuit. In an equivalent circuit 1800, the junction leaks $JLG_S$ and $JLG_D$ in the equivalent circuit 1700 depicted in FIG. 17 are substituted by junction resistances $RJLG_S$ and $RJLG_D$. Although the connection relations and values of coefficients in the equivalent circuit 1700 are defined in the model circuit, such details will not be described and the equivalent circuit 1700 will be described as the model circuit.

Provided the device process is not specialized, the junction capacitances $CJG_S$ and $CJG_D$ are equivalent and the junction resistances $RJLG_S$ and $RJLG_D$ are equivalent when Vbs=Vbd. Therefore, it is assumed that equalities $CJG=CJG_S=CJG_D$ and $RJLG=RJLG_S=RJLG_D$ are established. According to BSIM 4.6.2, the junction capacitance CJG is expressed as by the equations below.

$$CJG = CJSWGS(T) \cdot \left(1 - \frac{V_{bs}}{PBSWGS(T)}\right)^{-MJSWGS} \quad (1)$$

$$CJSWGS(T) = CJSWGS \cdot [1 + TCJSWG \cdot (T - TNOM)] \quad (2)$$

$$PBSWGS(T) = PBSWGS - TPBSWG \cdot (T - TNOM) \quad (3)$$

Where, "T" represents the temperature and "TNOM", "CJSWGS", "PBSWGS", "MJSWGS", "TCJSWG", and "TPBSWG" are parameters used in the BSIM 4.6.2 (see, e.g., Wenwei (Morgan) Yang, et al, "BSIM 4.6.2 MOSFET MODEL User's Manual", [online], 2008, Department of Electrical Engineering and Computer Sciences, University of California, Berkeley, Calif. 94720 [retrieved on Dec. 11, 2009], [URL: http://www.device.eecs.berkeley.edu/bsim3/BSIM4/BSIM462/doc/BSIM462_Manual.pdf]). "CJSWGS (T)" and "PBSWGS(T)" in equation (1) respectively represent equations (2) and (3).

Assuming that the temperature T is, for example, T=TNOM(=room temperature), equation (4) below is obtained by substituting T=TNOM into equation (1).

$$CJG = CJSWGS \cdot \left(1 - \frac{V_{bs}}{PBSWGS}\right)^{-MJSWGS} \quad (4)$$

The junction capacitance CJG is conventionally calculated according to equation (4). Admittance, conductance, and susceptance can be expressed as equations (5) to (7) from the equivalent circuit 1800.

$$Y_{cnv} = G_{cnv} + jB_{cnv} \quad (5)$$

$$G_{cnv} = \frac{1}{RJLG_S} + \frac{1}{RJLG_D} \quad (6)$$

$$B_{cnv} = \omega \cdot (CJG_S + CJG_D) \quad (7)$$

Where, equalities $CJG = CJG_S = CJG_D$ and $RJLG = RJLG_S = RJLG_D$ are established. "$Y_{cnv}$" represents the admittance. "$G_{cnv}$" represents the conductance. "$B_{cnv}$" represents the susceptance. "CJG" can be represented as equation (8) below from equation (7).

$$CJG = \frac{B_{cnv}}{2\omega} \quad (8)$$

Actual measurement of the susceptance B/2ω is regarded as measurement of the junction capacitance CJG.

Although not depicted, a region is formed whose impurity concentration is relatively higher than that of the substrate (hereinafter, "intermediate node"), between the source and the drain regions due to a short-channel effect.

Nevertheless, the gate length has become short due to finer scaling, whereby the depletion layer 111 formed by the source region 103 and the substrate 109 and a depletion layer formed by the drain region 104 and the substrate 109 (both depletion layers being formed immediately beneath the intermediate node) may be adjacent to each other or may overlap each other.

When the junction capacitance CJG is calculated according to equation (4) using the equivalent circuit 1800 depicted in FIG. 18 as an input, a problem arises in that the junction capacitance CJG does not coincide with the measured capacitance due to the influence of the depletion layer 111 that spreads out immediately beneath the intermediate node. Therefore, another problem arises in that the accuracy of the simulation is degraded.

SUMMARY

According to an aspect of an embodiment, a non-transitory computer-readable recording medium stores therein a verification program that causes a computer to execute a process that includes detecting from a model circuit concerning a field effect transistor: a first circuit that represents a junction of a source region and a substrate region and has a first junction resistance and a first junction capacitance, a second circuit that is parallel to the first circuit, represents a junction of a drain region and the substrate region, and has a second junction resistance equivalent to the first junction resistance and a second junction capacitance equivalent to the first junction capacitance, and a connection resistance that connects the first circuit, the second circuit, and a substrate electrode; calculating a first coefficient based on the first and the second junction resistances and the connection resistance, the first coefficient indicating impact of the first and the second junction resistances and the connection resistance on amplitude variation; calculating a second coefficient based on the first and the second junction capacitances and the connection resistance, the second coefficient indicating impact of the first and the second junction capacitances and the connection resistance on phase variation; correcting the first and the second junction capacitances using a sum of the first and the second coefficients; and outputting a result obtained by the correcting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
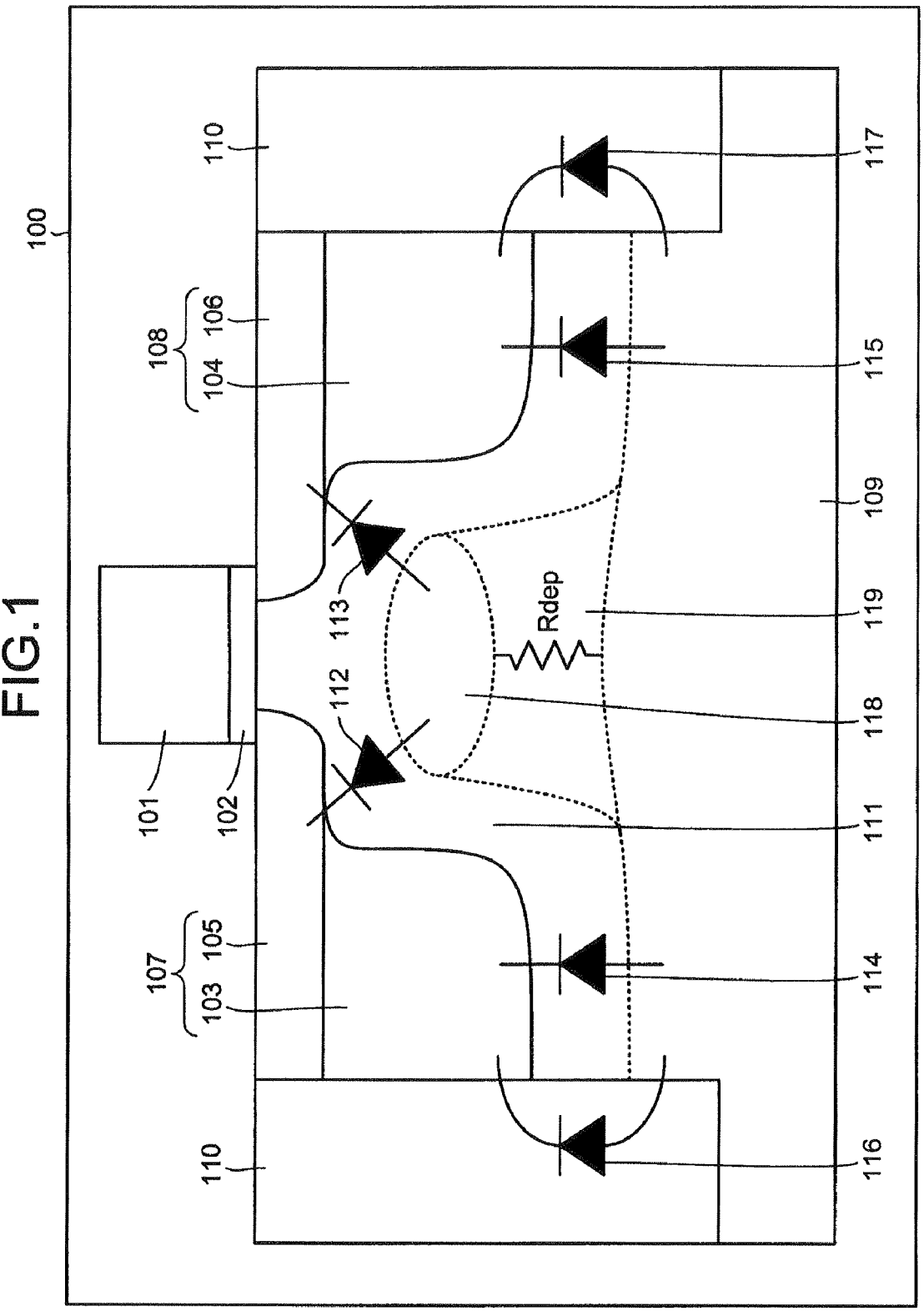
FIG. 1 is an explanatory diagram of an example of an overlapping of depletion layers.

FIG. 1 is an explanatory diagram of an example of an overlapping of depletion layers. With respect to FIG. 1, only that which differs from the vertical structure 1500 will be described. FIG. 1 depicts an example where in a vertical structure 100, a depletion layer (hereinafter, "first depletion layer") that spreads out toward the gate electrode side of the source region 103 and the gate electrode side of the substrate 109, in the depletion layer 111 and a depletion layer (hereinafter, "second depletion layer") that spreads out toward the gate electrode side of the drain region 104 and the gate electrode side of the substrate 109, in the depletion layer 111, overlap. An intermediate node 118 is formed to have a P-type concentration that is relatively higher than the P-type concentration of the substrate 109 to suppress the short-channel effect.

Thus, the first and the second depletion layers spread out avoiding the intermediate node 118 and come close to each other or overlap in a region 119 immediately beneath the intermediate node 118. The first and the second depletion layers tend to avoid overlapping into each other if the gate length is long, and tend to overlap into each other if the gate length is short. Therefore, the influence by the region 119 conspicuously appears due to finer scaling.

The "depletion layer" is a region that includes substantially neither electrons nor positive holes. In the embodiment, the region 119 is represented by a connection resistance "Rdep" and is denoted to have a low resistance similarly to the substrate 109 when the first and the second depletion layers are away from each other and to have a high resistance when the first and the second depletion layers are adjacent to each other or contact each other and the region 119 is depleted.

In the embodiment, an example will be described where an equivalent circuit in which the influence of the depletion layers is represented by the connection resistance Rdep is simulated using the equivalent circuit as an input. The equivalent circuit that includes the connection resistance Rdep will be described.

Figure 2:
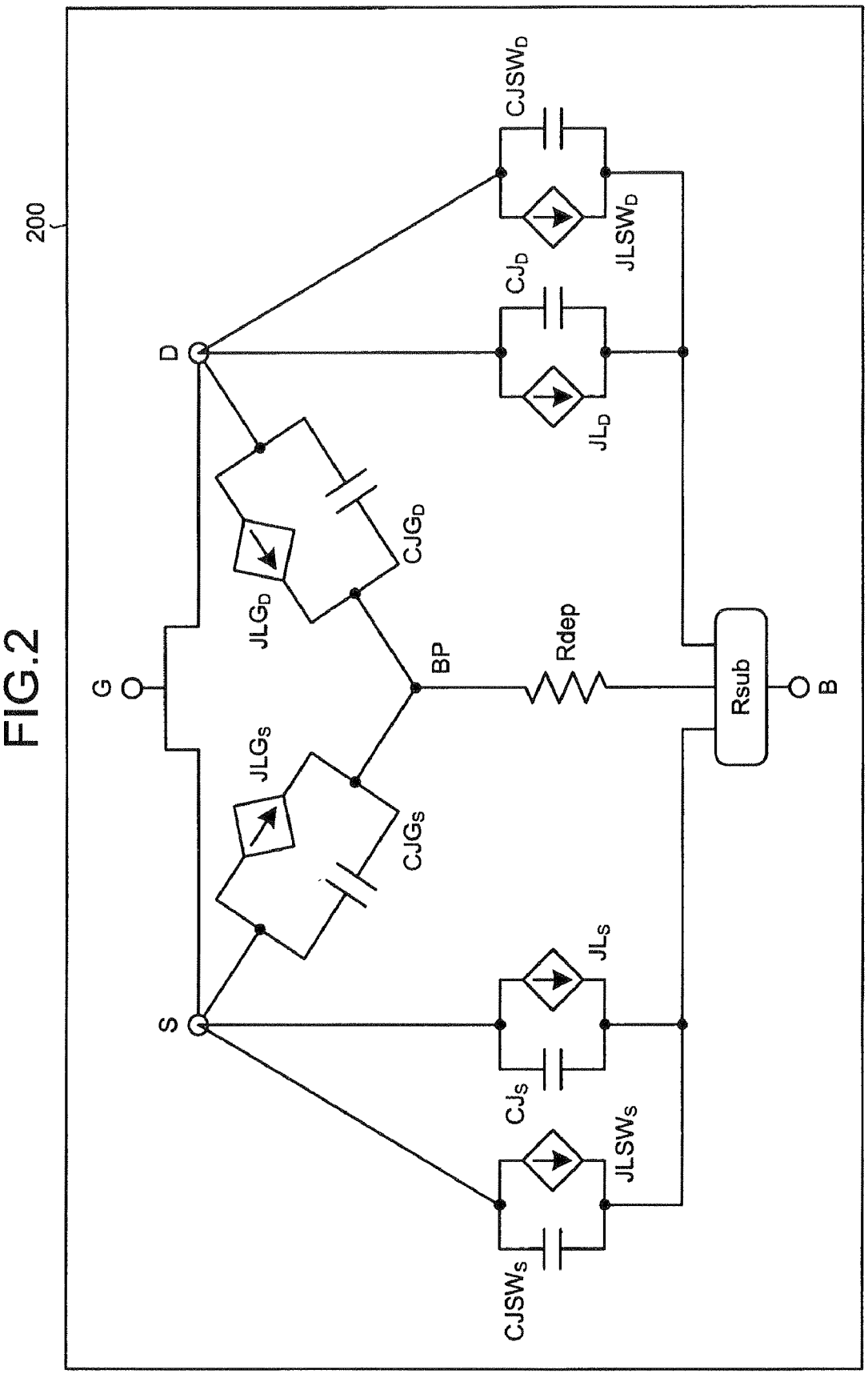
FIG. 2 is an explanatory diagram of an exemplary equivalent circuit of an NMOS of the present invention.
Figure 16:
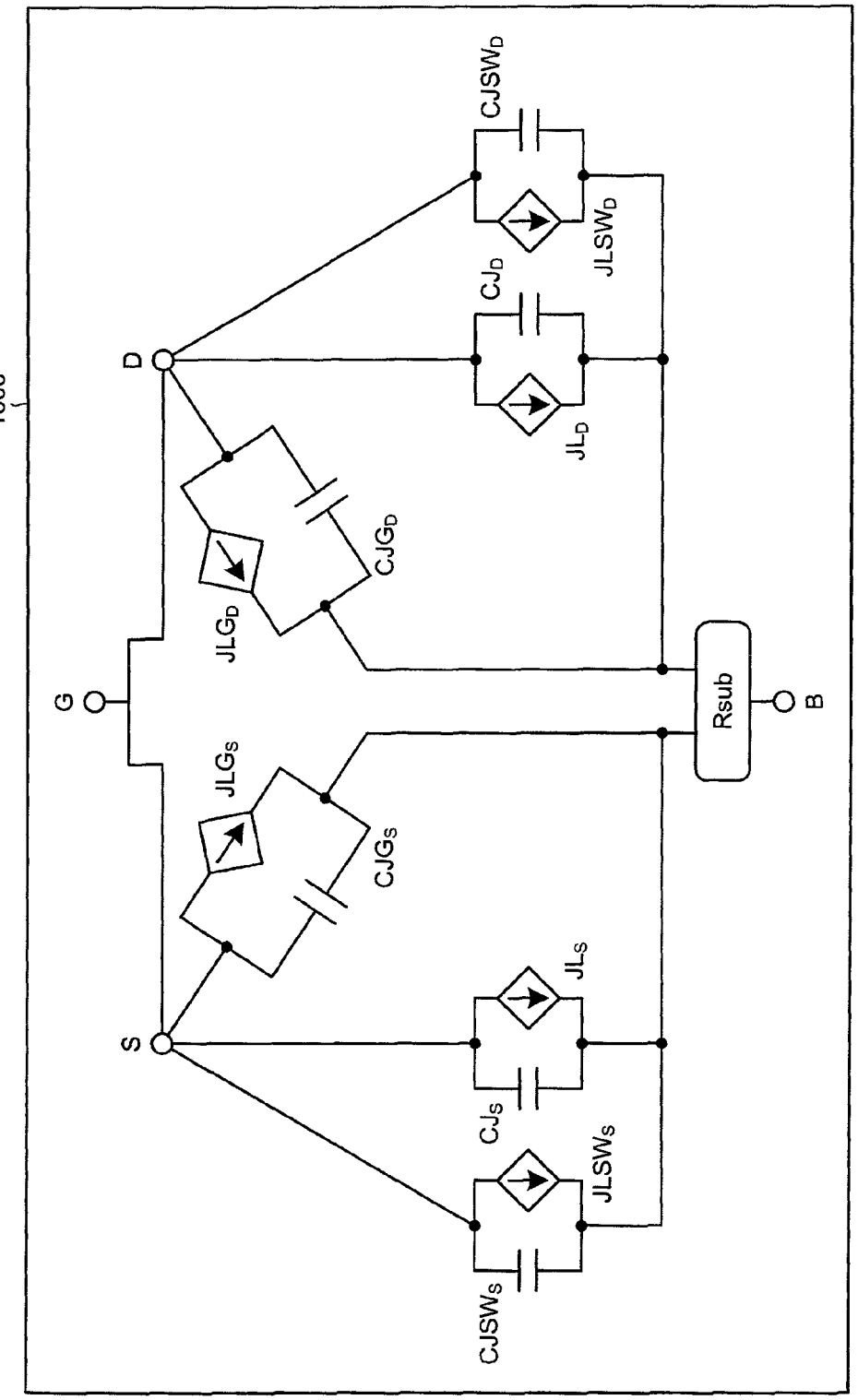
FIG. 16 is an explanatory diagram of an exemplary equivalent circuit of a conventional NMOS.
Figure 17:
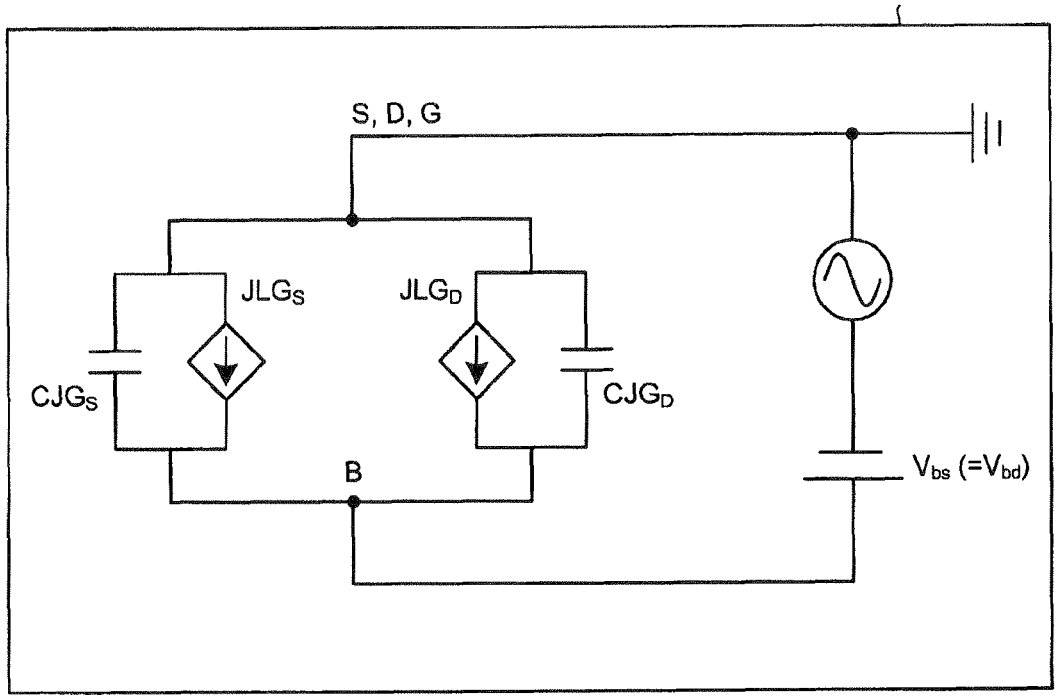
FIG. 17 is an explanatory diagram of an example concerning junction capacitance and junction leak on a gate side of a conventional equivalent circuit.
Figure 18:
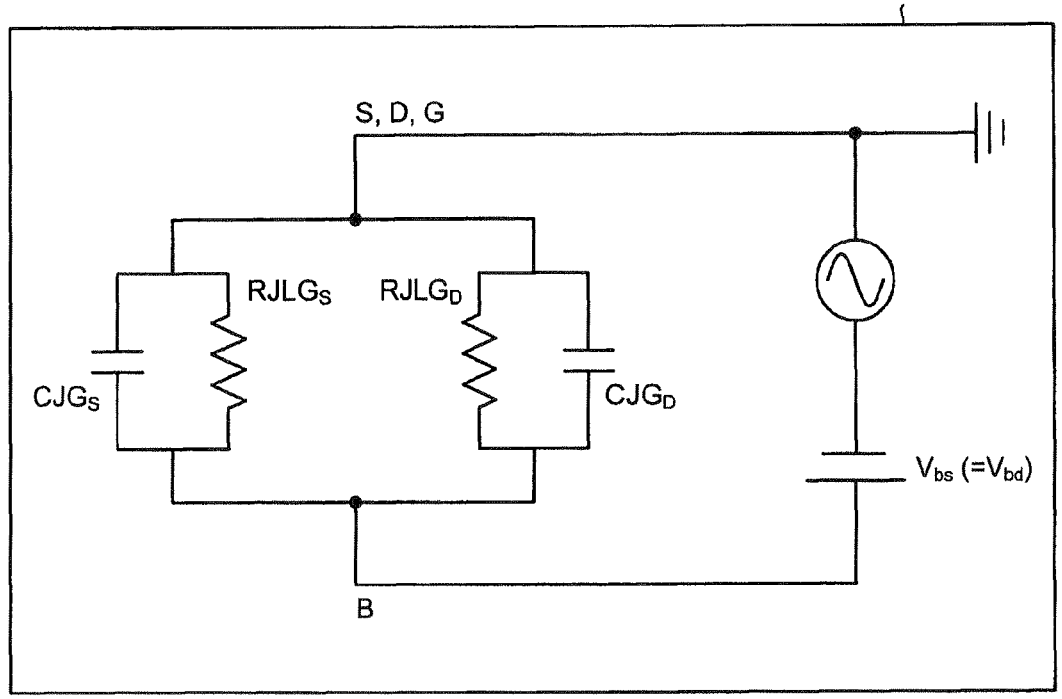
FIG. 18 is an explanatory diagram of an example related to substituting the junction leaks with resistors in a conventional equivalent circuit.

FIG. 2 is an explanatory diagram of an exemplary equivalent circuit of an NMOS of the present invention. With respect to FIG. 2 only that which differs from the equivalent circuit 1600 depicted in FIG. 16 will be described. As depicted in FIG. 2, in an equivalent circuit 200, junction capacitances $CJG_S$ and $CJG_D$, and junction leaks $JLG_S$ and $JLG_D$ are connected to a substrate resistance Rsub through the connection resistance Rdep. "BP" denotes the intermediate node 118.

Figure 3:
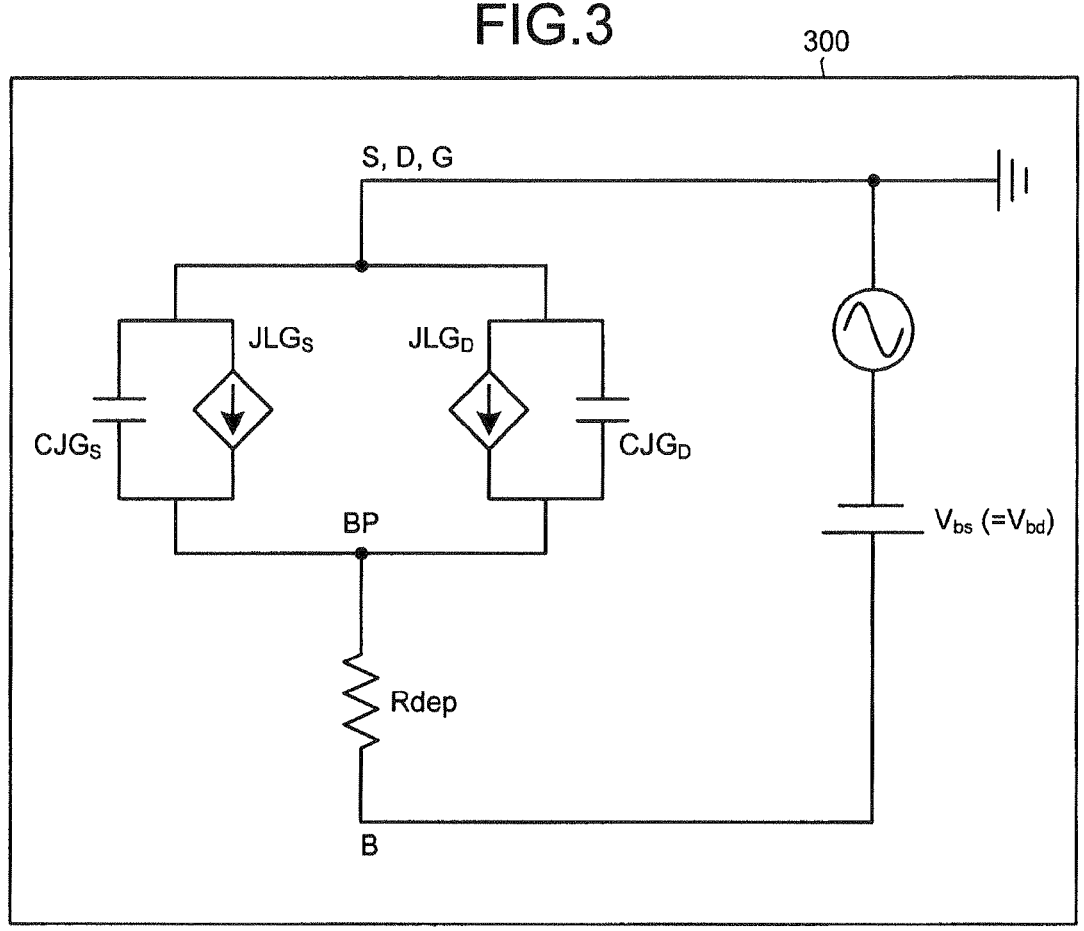
FIG. 3 is an explanatory diagram concerning junction capacitance and junction leak on a gate side in the exemplary equivalent circuit.

FIG. 3 is an explanatory diagram concerning the junction capacitance and the junction leak on the gate side in the exemplary equivalent circuit. In FIG. 3, only the junction capacitances $CJG_S$ and $CJG_D$, the junction leaks $JLG_S$ and $JLG_D$, and the connection resistance Rdep in an equivalent circuit 300 are depicted and other junction capacitances and junction leaks are omitted. In the equivalent circuit 300, a gate electrode G, a source electrode S, and a drain electrode D are grounded at a common potential. A bias (in this case, $V_{bs}=V_{bd}$) and a small-signal AC power source are disposed between a substrate electrode B and the ground. The substrate resistance Rsub can be disregarded because the substrate resistance Rsub is small compared to the junction leaks $JLG_S$ and $JLG_D$.

Figure 4:
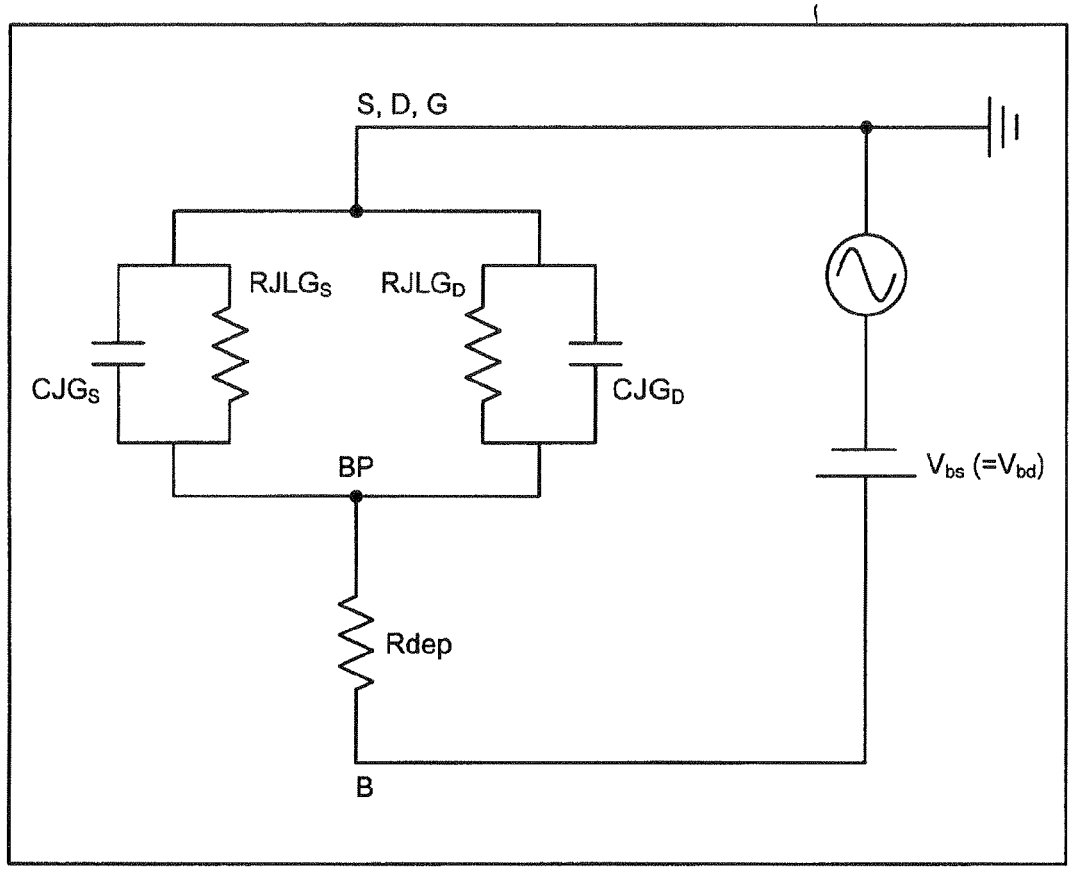
FIG. 4 is an explanatory diagram of an example where the junction leaks are substituted by resistance elements.

FIG. 4 is an explanatory diagram of an example where the junction leaks are substituted by resistance elements. The junction leaks can be substituted by junction resistances as described above. Therefore, in an equivalent circuit 400, the junction leaks $JLG_S$ and $JLG_D$ of the equivalent circuit 300 depicted in FIG. 3 are respectively substituted by the junction resistances $RJLG_S$ and $RJLG_D$.

Since $V_{bs}=V_{bd}$, provided the device process is not specialized, the junction capacitances $CJG_S$ and $CJG_D$ are equivalent and the junction resistances $RJLG_S$ and $RJLG_D$ are equivalent.

Although the connection relations and the values of coefficients in the equivalent circuit 400 are defined in the model circuit, such details will not be described and the equivalent circuit 400 will be described as the model circuit. The equivalent circuit 400 is stored in a storage device that is accessible by a computer.

Figure 5:
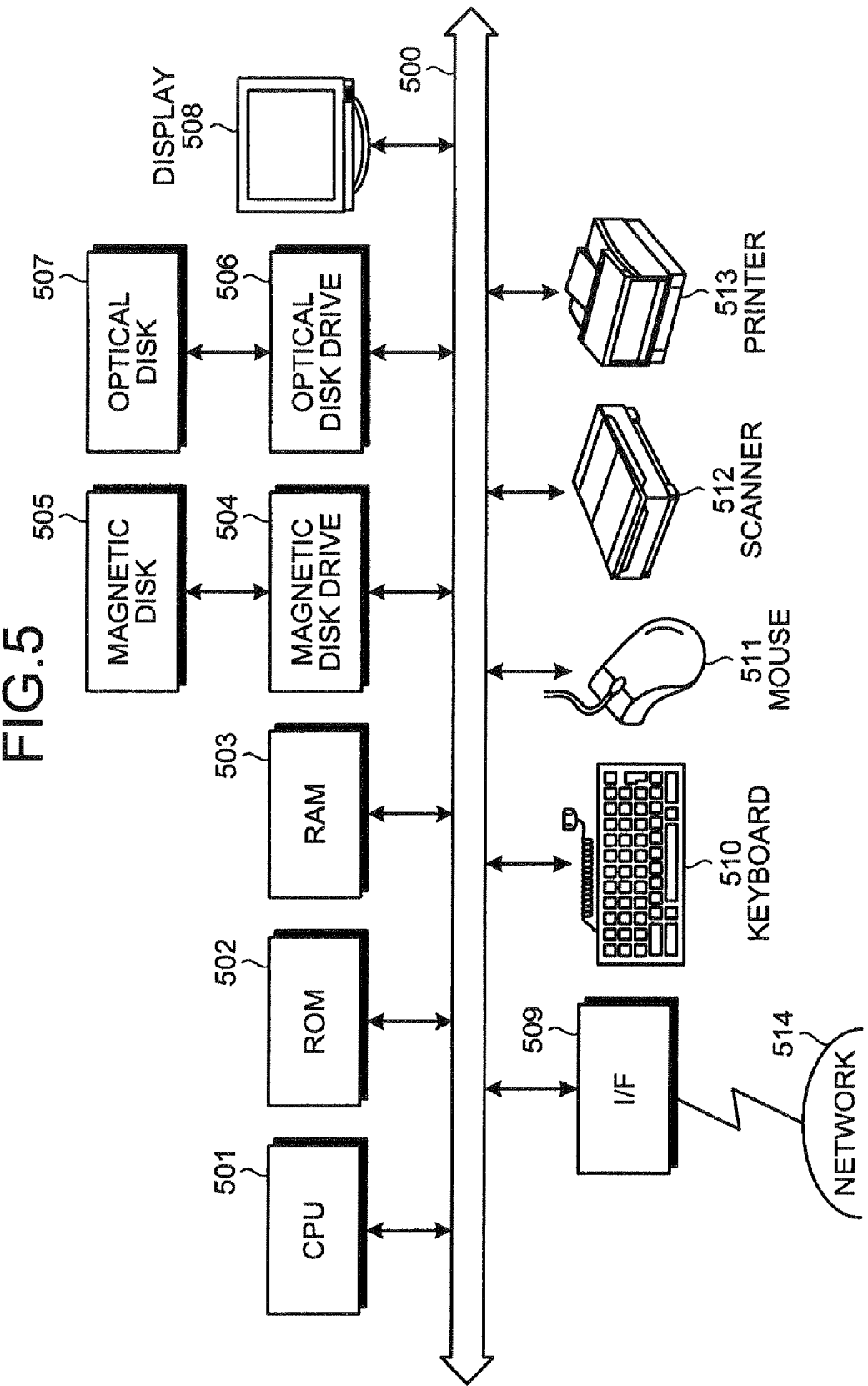
FIG. 5 is a block diagram of a hardware configuration of a verification apparatus according to an embodiment.

FIG. 5 is a block diagram of a hardware configuration of a verification apparatus according to the embodiment. As depicted in FIG. 5, the verification apparatus includes a central processing unit (CPU) 501, a read-only memory (ROM) 502, a random access memory (RAM) 503, a magnetic disk drive 504, a magnetic disk 505, an optical disk drive 506, an optical disk 507, a display 508, an interface (I/F) 509, a keyboard 510, a mouse 511, a scanner 512, and a printer 513, respectively connected by a bus 500.

The CPU 501 governs overall control of the verification apparatus. The ROM 502 stores therein programs such as a boot program. The RAM 503 is used as a work area of the CPU 501. The magnetic disk drive 504, under the control of the CPU 501, controls the reading and writing of data with respect to the magnetic disk 505. The magnetic disk 505 stores therein data written under control of the magnetic disk drive 504.

The optical disk drive 506, under the control of the CPU 501, controls the reading and writing of data with respect to the optical disk 507. The optical disk 507 stores therein data written under control of the optical disk drive 506, the data being read by a computer.

The display 508 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 508.

The I/F 509 is connected to a network 514 such as a local area network (LAN), a wide area network (WAN), and the Internet through a communication line and is connected to other apparatuses through the network 514. The I/F 509 administers an internal interface with the network 514 and controls the input/output of data from/to external apparatuses. For example, a modem or a LAN adaptor may be employed as the I/F 509.

The keyboard 510 includes, for example, keys for inputting letters, numerals, and various instructions and performs the input of data. Alternatively, a touch-panel-type input pad or numeric keypad, etc. may be adopted. The mouse 511 is used to move the cursor, select a region, or move and change the size of windows. A track ball or a joy stick may be adopted provided each respectively has a function similar to a pointing device.

The scanner 512 optically reads an image and takes in the image data into the verification apparatus. The scanner 512 may have an optical character reader (OCR) function as well. The printer 513 prints image data and text data. The printer 513 may be, for example, a laser printer or an ink jet printer.

Figure 6:
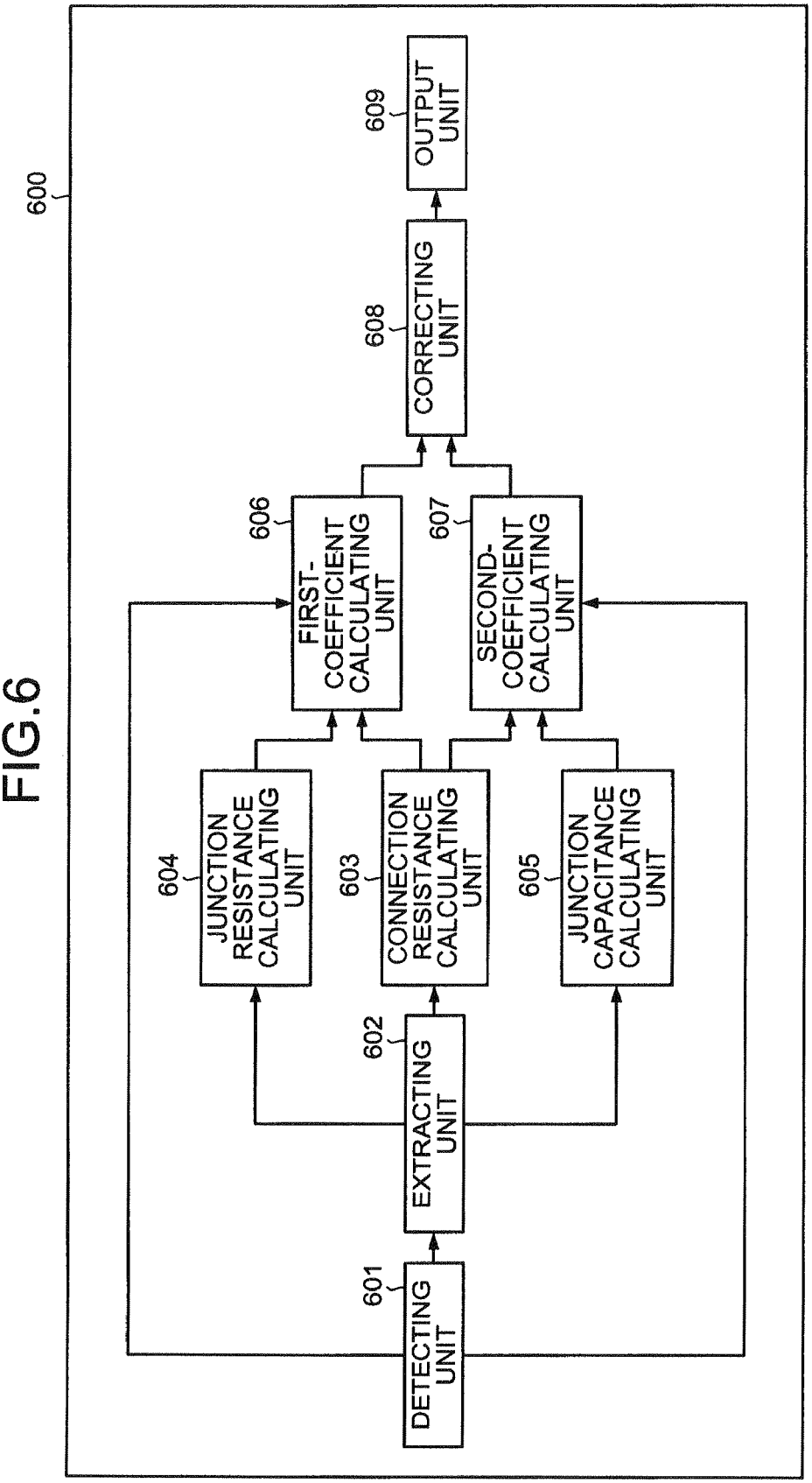
FIG. 6 is a block diagram of a functional configuration of the verification apparatus.

FIG. 6 is a block diagram of a functional configuration of the verification apparatus. As depicted in FIG. 6, a verification apparatus 600 includes a detecting unit 601, an extracting unit 602, a connection resistance calculating unit 603, a junction resistance calculating unit 604, a junction capacitance calculating unit 605, a first-coefficient calculating unit 606, a second-coefficient calculating unit 607, a correcting unit 608, and an output unit 609. The respective functions (the detecting unit 601 to the output unit 609) may be implemented, for example, via the I/F 509 or by the execution of a program by the CPU 501, the program being stored in a storage device such as the ROM 502, the RAM 503, the magnetic disk 505, and the optical disk 507 depicted in FIG. 5.

The detecting unit 601 detects, from the model circuit concerning the field effect transistor, parallel circuits, including a circuit representing the junction of the source region and the substrate region and having a first junction resistance and a first junction capacitance, and a circuit representing the junction of the drain region and the substrate region and having a second junction resistance of a resistance equivalent to that of the first junction resistance and a second junction capacitance of a capacitance equivalent to that of the first junction capacitance. The detecting unit 601 further detects from the model circuit, connection resistance connecting the parallel circuits and the substrate electrode.

For example, the CPU 501 accesses the storage device and detects from the equivalent circuit 400, a circuit that includes the junction capacitance $CJG_S$ and the junction resistance $RJLG_S$, and a circuit parallel thereto and that includes the junction capacitance CJGD and the junction resistance $RJLG_D$. For example, the CPU 501 further detects the connection resistance Rdep, from the equivalent circuit 400.

The extracting unit 602 extracts parameters concerning the connection resistance Rdep, the junction capacitance CJG, and the junction resistance RJLG. The parameters are defined in the equivalent circuit 400. Alternatively, the parameters may be stored correlated with the equivalent circuit 400 in a storage device accessible by the CPU 501. The parameters will be described hereinafter.

To implement the processing of the extracting unit 602, for example, the CPU 501 extracts the parameters defined in the equivalent circuit 400, from the equivalent circuit 400. Alternatively, for example, the CPU 501 accesses the storage device storing therein the parameters concerning the equivalent circuit 400 and extracts the parameters. Values that are defined in the equivalent circuit 400 as the parameters may be extracted for a first and a second width of the depletion layer 111 described hereinafter. However, in the embodiment, the first and the second widths are calculated by the connection resistance calculating unit 603. Calculation of the connection resistance Rdep will be described in detail.

Figure 7:
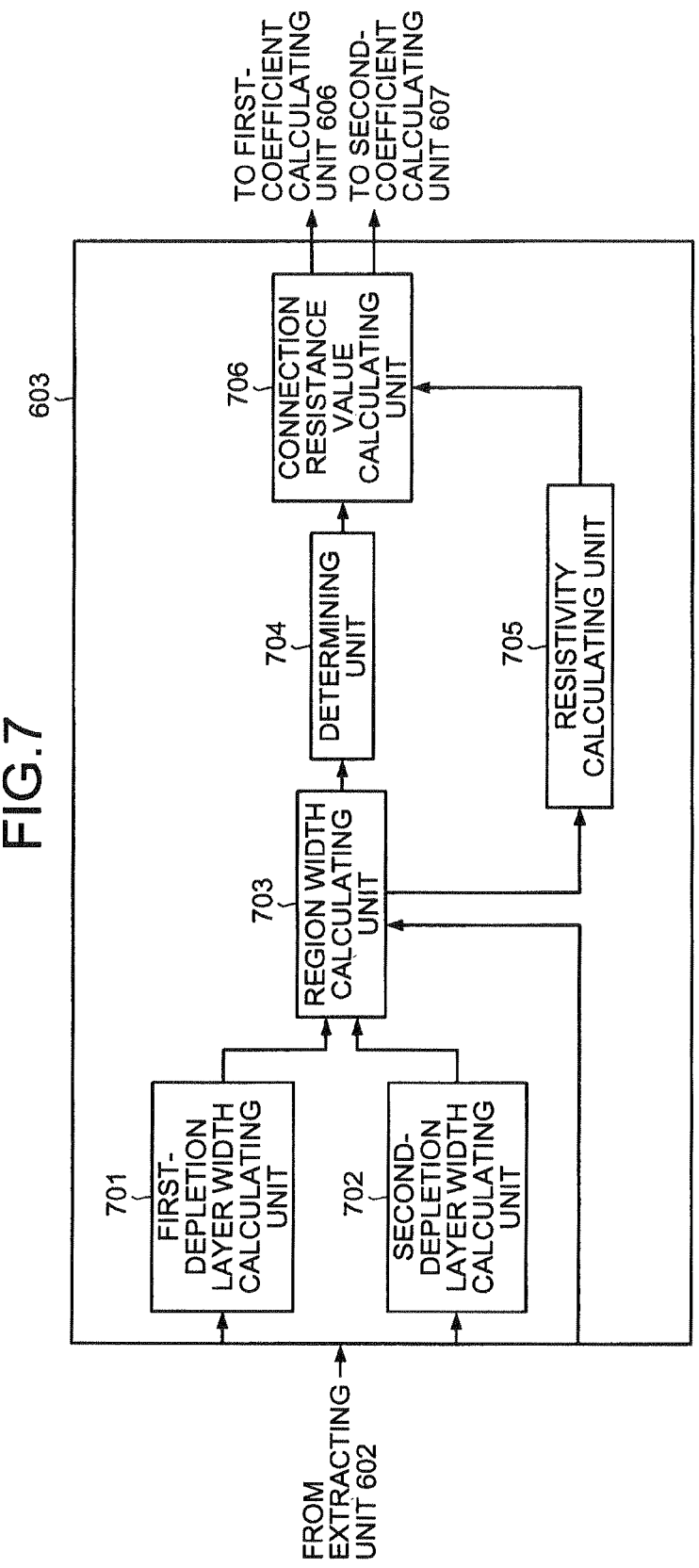
FIG. 7 is an explanatory diagram of a connection resistance calculating unit.

FIG. 7 is an explanatory diagram of the connection resistance calculating unit 603. The connection resistance calculating unit 603 is a function that calculates the connection resistance. The connection resistance calculating unit 603 includes a first-depletion layer width calculating unit 701, a second-depletion layer width calculating unit 702, a region width calculating unit 703, a determining unit 704, a resistivity calculating unit 705, and a connection resistance calculating unit 706.

The first-depletion layer width calculating unit 701 calculates a first width of the depletion layer based on a first initial width and the voltage between the source electrode and the substrate electrode.

The second-depletion layer width calculating unit 702 calculates a second width of the depletion layer based on a second initial width and the voltage between the drain electrode and the substrate electrode.

The region width calculating unit 703 sums the gate length and a first length and a second length. The region width calculating unit 703 calculates a third width that spans from an edge portion on the drain region side of the first depletion layer to an edge portion on the source region side of the second depletion layer by subtracting the sum of the first and the second widths of the depletion layer from the sum of the gate length and a first length and a second length. The third width is the width of the region that is represented by the connection resistance.

The resistivity calculating unit 705 calculates the resistivity in the region that is represented by the connection resistance, by dividing the coefficient for the resistance of the substrate region by the third width calculated by the region width calculating unit 703.

The connection resistance calculating unit 706 calculates the connection resistance by dividing the resistivity calculated by the resistivity calculating unit 705 by the gate width.

Equations concerning the processes by the first-depletion and the second-depletion layer width calculating units 701 and 702 will be described. Furthermore, equations concerning the processes by the region width calculating unit 703, the resistivity calculating unit 705, and the connection resistance calculating unit 706 will be described.

Figure 8:
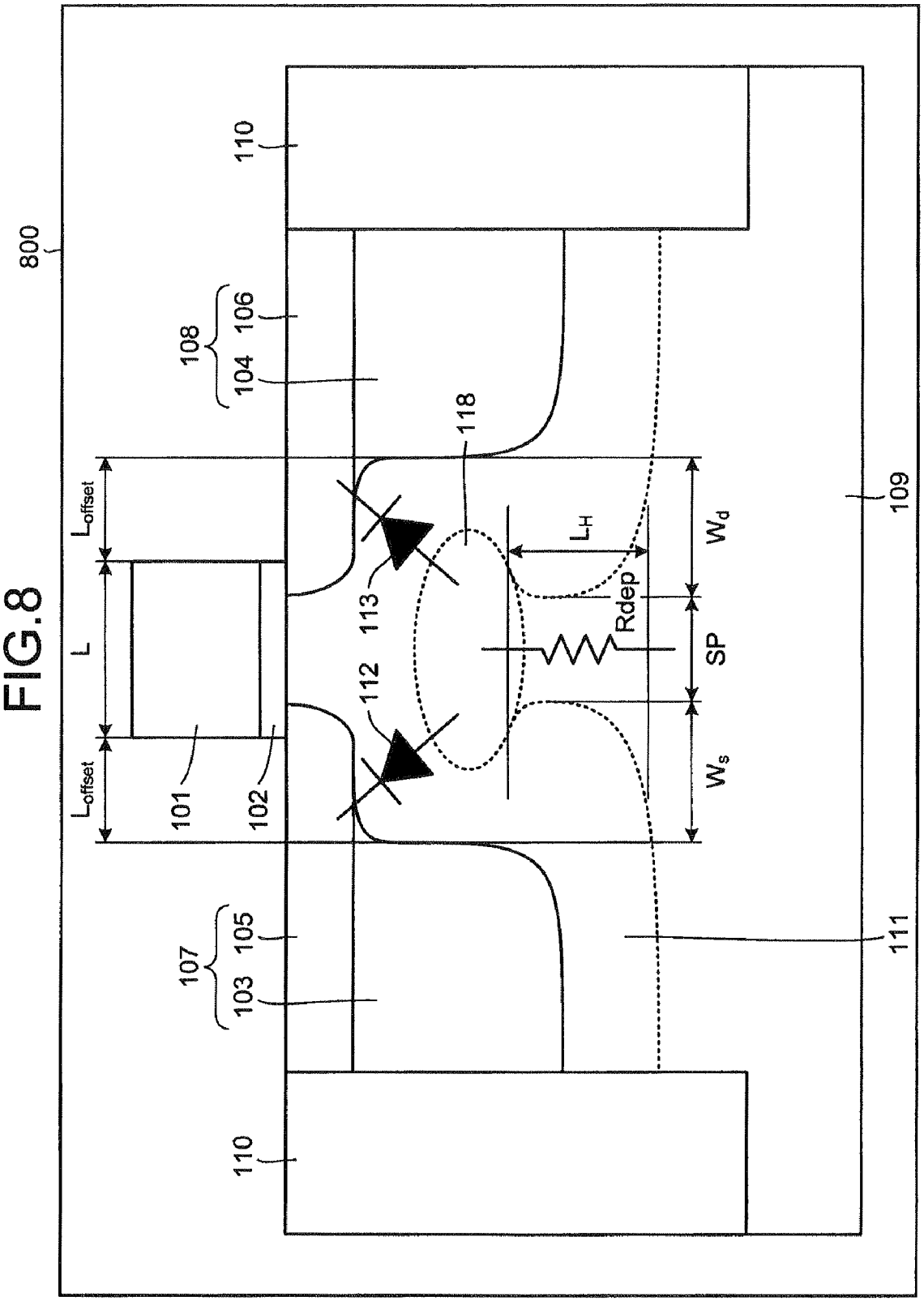
FIG. 8 is an explanatory diagram for a connection resistance Rdep.

FIG. 8 is an explanatory diagram for the connection resistance Rdep. A vertical structure 800 depicts the connection resistance Rdep. The connection resistance Rdep represents the effect of the depletion caused by the source region 103 and the substrate 109 and the effect of the depletion by the drain region 104 and the substrate 109, occurring immediately beneath the intermediate node 118.

"L" represents the gate length. "$L_{offset}$" represents the first length from a plane that substantially includes an edge portion that is of the source region 103 and faces the drain region 104, to an edge portion that is of the gate electrode 101 and opposes the plane. "$L_{offset}$" further represents the second length from a plane that substantially includes an edge portion that is of the drain region 104 and faces the source region 103, to an edge portion that is of the gate electrode 101 and opposes the plane. Provided the device process is not specialized, the first and the second lengths are equivalent.

"$W_s$" represents the first width of the depletion layer 111, as depicted in FIG. 8. "$W_d$" represents the second width of the depletion layer 111, as depicted in FIG. 8. "SP" represents the third width from an edge portion on the drain region side of the first depletion layer to an edge portion on the source region side of the second depletion layer. Calculation of the third width SP will be described.

The parameters concerning the connection resistance Rdep are coefficients concerning the gate length L, the first and the second lengths $L_{offset}$, the first and the second widths $W_s$ and $W_d$ of the depletion layer 111, and the resistance of the substrate region. The gate length L may also be calculated according to equation (19) below.

The parameters concerning the connection resistance Rdep include the voltage between the source electrode and the substrate electrode ($V_{bs}$) and the voltage between the drain electrode and the substrate electrode ($V_{bd}$).

In the embodiment, the first and the second widths $W_s$ and $W_d$ of the depletion layer 111 are respectively calculated by the first-depletion and the second-depletion layer width calculating units 701 and 702.

For example, assuming that each PN junction is a step junction and the impurity concentration of the source region 107 and the drain region 108 is sufficiently higher than the channel impurity concentration, the first and the second widths $W_s$ and $W_d$ of the depletion layer 111 are respectively expressed as equations (9) and (10) below.

$$W_s = \left[\frac{2\varepsilon_{si}}{qN_a}(\phi_{bi} - V_{bs})\right]^{\frac{1}{2}} \quad (9)$$

$$W_d = \left[\frac{2\varepsilon_{si}}{qN_a}(\phi_{bi} - V_{bd})\right]^{\frac{1}{2}} \quad (10)$$

Where, "$\varepsilon_{si}$" represents a dielectric constant; "q" represents the elementary electric charge; "$N_a$" represents the channel impurity concentration; and "$\phi_{bi}$" represents an internal potential. Equations (11) and (12) below are expressed based on equations (9) and (10), respectively.

$$W_s = W0\left(1 - \frac{V_{bs}}{\phi_{bi}}\right)^M \quad (11)$$

$$W_d = W0\left(1 - \frac{V_{bd}}{\phi_{bi}}\right)^M \quad (12)$$

Where, "W0" represents a first initial width of the depletion layer 111 formed by the source region 103 and the substrate 109 when the voltage ($V_{bs}$) between the source electrode S and the substrate electrode B is zero. "W0" further represents a second initial width of the depletion layer 111 formed by the drain region 104 and the substrate 109 when the voltage ($V_{bd}$) between the drain electrode D and the substrate electrode B is zero. Provided the device process is not specialized, the first and the second initial widths are equivalent and therefore, are both represented by "W0" in the embodiment.

"M" represents a bias dependent coefficient of the depletion layer width of the deep PN junction. "$\phi_{bi}$" represents an internal potential of the deep PN junction. Assuming that the PN junction is a step junction, W0, M, and $\phi_{bi}$ are each uniquely determined. However, the PN junction is not always a step junction and therefore, W0, M, and $\phi_{bi}$ are handled as fitting parameters. W0, M, and $\phi_{bi}$ are defined in the model circuit as parameters concerning the connection resistance Rdep. Alternatively, W0, M, and $\phi_{bi}$ are stored in a storage device that is accessible by the CPU 501.

For example, a function of the first-depletion layer width calculating unit 701 is implemented by the CPU 501 calculating the width $W_s$ of the depletion layer 111 by substituting the extracted parameters into equation (11).

Further, a function of the second-depletion layer width calculating unit 702 is implemented, for example, by the CPU 501 calculating the width $W_d$ of the depletion layer 111 by substituting the extracted parameters into equation (12).

Equations (11) and (12) are defined in the equivalent circuit 400 or stored in a storage device that is accessible by the CPU 501.

The processes by the region width calculating unit 703, the resistivity calculating unit 705, and the connection resistance calculating unit 706 will be described in detail. The connection resistance Rdep is expressed by equation (13) below using the gate length L, the gate width W, and the first and the second widths $W_s$ and $W_d$ of the depletion layer 111.

$$Rdep = \rho \frac{LH}{(L + 2L_{offset} - W_s - W_d) \cdot W} \quad (13)$$
$$= \frac{RH}{(L + 2L_{offset} - W_s - W_d) \cdot W}$$
$$= \frac{RdepW}{W}$$

Where, "$\rho$" represents the resistivity [$\Omega \cdot m$] of a well; "LH" represents the distance [m] from the deepest point of the intermediate node 118 to the deepest point of the source or the drain region; and "W" represents the gate width. "RH" [$\Omega \cdot m^2$] is the result of ($\rho$ [$\Omega \cdot m$]×LH [m]) and is a fitting parameter. "RH" and the gate width W are parameters concerning the connection resistance Rdep. "W" may also be calculated according to equation (20) described hereinafter.

"(L+2$L_{offset}$−$W_s$−$W_d$)" in the denominator of the equation (13) represents the third width SP.

For example, a function of the region width calculating unit 703 is implemented by the CPU 501 calculating the third width SP by calculating (L+2$L_{offset}$−$W_s$−$W_d$) in the denominator of equation (13).

"RdepW" is obtained from {RH [$\Omega \cdot m^2$]/(L+2$L_{offset}$−$W_s$−$W_d$) [m]} and represents the resistivity in the region represented by the connection resistance Rdep.

For example, a function of the resistivity calculating unit 705 is implemented by the CPU 501 calculating the resistivity RdepW by dividing "RH" in equation (13) by the third width SP.

For example, a function of the connection resistance calculating unit 706 is implemented by the CPU 501 calculating the connection resistance Rdep based on the resistivity RdepW and the gate width W in equation (13). Equation (13) is stored in a storage device that is accessible by the CPU 501 or is defined in the equivalent circuit.

When the third width SP is zero, equation (13) diverges and this means that the first and the second depletion layers contact each other and, as depicted in FIG. 1, also means that the first and the second depletion layers overlap into each other. In actuality, a small amount of carriers are present even in a depletion layer and therefore, the resistance of the depletion layer does not become infinite.

Therefore, a user preliminarily determines an upper limit as a fitting parameter for the resistivity Rdep. The upper limit is represented by "RdepWmax". The upper limit RdepWmax is a parameter concerning the connection resistance Rdep.

The determining unit 704 determines whether the width calculated by the region width calculating unit 703 is zero or less. If the determining unit 704 determines that the width is zero or less, the connection resistance calculating unit 706 calculates the connection resistance by dividing a designated resistivity by the gate width. For example, the CPU 501 determines whether the third width SP is zero or less.

For example, if the CPU 501 determines that the third width SP is zero or less, the CPU 501 sets the upper limit RdepWmax for the resistivity RdepW and calculates the connection resistance Rdep by dividing the resistivity RdepW by the gate width W.

The determining unit 704 further determines whether the resistivity calculated by the resistivity calculating unit 705 is larger than the designated resistivity. If the determining unit 704 determines that the resistivity is larger than the designated resistivity, the connection resistance calculating unit 706 calculates the connection resistance by dividing the designated resistivity by the gate width.

For example, if the CPU 501 determines that the third width SP is larger than zero, the CPU 501 further determines whether the resistivity RdepW is larger than the upper limit RdepWmax. If the CPU 501 determines that the resistivity RdepW is larger than the upper limit RdepWmax, the CPU 501 sets the upper limit RdepWmax for the resistivity RdepW. For example, the CPU 501 calculates Rdep by dividing the resistivity RdepW by the gate width W.

The resistivity RdepW is dependent on the gate length L, the voltage between the source electrode S and the substrate electrode B, and the voltage between the drain electrode D and the substrate electrode B as expressed by equation (13). If the gate length L is long, the resistivity RdepW is small and similarly to the conventional case, the PN-junction diodes 112 and 113 are directly connected to the substrate electrode B without the connection resistance Rdep therebetween.

As expressed by equation (13), if a reverse bias is applied between the source electrode S and the substrate electrode B and between the drain electrode D and the substrate electrode B, the depletion layers caused by the deep junctions spread out, and the depletion layers caused by these deep junctions overlap into each other depending on the gate length L.

The junction capacitance calculating unit 605 calculates the junction capacitances $CJG_S$ and $CJG_D$. The capacitances CJG are calculated according to equation (4) similarly to the conventional case.

The junction resistance calculating unit 604 calculates RJLG. RJLG are calculated similarly to the conventional case. According to BSIM 4.6.2, "JLG" is determined by equation (14).

$$JLG = W_{effcj} \cdot NF \cdot JSSWGS(T) \cdot \left[\exp\left(\frac{q \cdot V_{bs}}{NJS \cdot k_B \cdot TNOM}\right) - 1\right] + \quad (14)$$
$$V_{bs} \cdot G_{min} - W_{effcj} \cdot NF \cdot JTSSWGS(T) \cdot$$
$$\left[\exp\left(\frac{-V_{bs}}{NJTSSWG(T) \cdot V_{tm0}} \cdot \frac{VTSSWGS}{VTSSWGS - V_{bs}}\right) - 1\right]$$

$$JSSWGS(T) = \quad (15)$$
$$JSSWGS \cdot \exp\left(\frac{\frac{E_g(TNOM)}{k_B \cdot TNOM} - \frac{E_g(T)}{k_B \cdot T} + XTIS \cdot \ln\left(\frac{T}{TNOM}\right)}{NJS}\right)$$

$$JTSSWGS(T) = JTSSWGS \cdot \left(\sqrt{\frac{JTWEFF}{W_{effcj}}} + 1\right) \cdot \quad (16)$$
$$\exp\left[\frac{-E_g(TNOM)}{k_B \cdot T} \cdot XTSSWGS \cdot \left(1 - \frac{T}{TNOM}\right)\right]$$

$$NJTSSWG(T) = NJTSSWG \cdot \left[1 + TNJTSSWG \cdot \left(\frac{T}{TNOM} - 1\right)\right] \quad (17)$$

$$W_{effcj} = \frac{W_{drawn}}{NF} + XW - 2 \cdot \left(DWJ + \frac{WLC}{L^{WLN}} + \frac{WWC}{W^{WWN}} + \frac{WWLC}{L^{WLN}W^{WWN}}\right) \quad (18)$$

$$L = L_{drawn} + XL \quad (19)$$

$$W = \frac{W_{drawn}}{NF} + XW \quad (20)$$

$$E_g(T) = 1.16 - \frac{7.02e - 4 \cdot T^2}{T + 1108} \quad (21)$$

$$V_{tm0} = \frac{k_B \cdot TNOM}{q} \quad (22)$$

"JSSWGS (T)", "JTSSWGS (T)", "NJTSSWG (T)", and "Weffcj" in equation (14) are respectively expressed as equations (15) to (18) according to BSIM 4.6.2. The gate length L, the gate width W, $E_g$ (T), and $V_{tm0}$ are respectively expressed as equations (19) to (22) according to BSIM 4.6.2.

Where, "$L_{drawn}$" represents a design gate length of the MOSFET; "$W_{drawn}$" represents a design gate width of the MOSFET; "NF" represents the number of fingers of the MOSFET; "q" represents the elementary electric charge; and "$k_B$" represents Boltzmann's constant.

"XL", "XW", "NF", "DWJ", "WLC", "WWC", "WWLC", "WLN", "WWN, "JSSWGS", "XTIS", and "NJS" are parameters according to BSIM 4.6.2. "JTSSWGS", "JTWEFF", "XTSSWGS", "VTSSWGS", "NJTSSWG", and "TNJTSSWG" are also parameters according to BSIM 4.6.2. "$G_{min}$" is a parameter to improve the convergence of the circuit simulator. Each of these parameters concern the junction resistance RJLG and will not be described because the parameters are known (see, e.g., Wen-wei (Morgan) Yang, et al., "BSIM 4.6.2 MOSFET MODEL User's Manual", [online], 2008, Department of Electrical Engineering and Computer Sciences, University of California, Berkeley, Calif. 94720 [retrieved on Dec. 11, 2009], the Internet [URL: http://www.device.eecs.berkeley.edu/~bsim3/BSIM4/BSIM462/doc/BSIM462Manual.pdf]).

In the embodiment, it is assumed that the temperature T is T=TNOM=room temperature. When (T=TNOM) is substituted into equation (14), "JLG" is expressed as Equation (23).

$$JLG = W_{effcj} \cdot NF \cdot JSSWGS \cdot \left[\exp\left(\frac{q \cdot V_{bs}}{NJS \cdot k_B \cdot TNOM}\right) - 1\right] + \quad (23)$$
$$V_{bs} \cdot G_{min} - W_{effcj} \cdot NF \cdot JTSSWGS \cdot \left(\sqrt{\frac{JTWEFF}{W_{effcj}}} + 1\right) \cdot$$
$$\left[\exp\left(\frac{-V_{bs}}{NJTSSWG \cdot V_{tm0}} \cdot \frac{VTSSWGS}{VTSSWGS - V_{bs}}\right) - 1\right]$$

"RJLG" represents a differential resistance and therefore, is expressed as equation (24) below.

$$RJLG = \frac{1}{\frac{\partial JLG}{\partial V_{bs}}} \quad (24)$$

-continued $$\frac{\partial JLG}{\partial V_{bs}} = \qquad (25)$$

$$W_{\mathit{effcj}} \cdot NF \cdot JSSWGS \frac{q}{NJS \cdot k_B \cdot TNOM} \cdot \exp\left(\frac{q \cdot V_{bs}}{NJS \cdot k_B \cdot TNOM}\right) +$$

$$G\min + W_{\mathit{effcj}} \cdot NF \cdot JTSSWGS\left(\sqrt{\frac{JTWEFF}{W_{\mathit{effcj}}}} + 1\right) \cdot$$

$$\frac{VTSSWGS^2}{NJTSSWG \cdot V_{tm0}} \cdot \frac{1}{(V_{bs} - VTSSWGS)^2} \cdot$$

$$\exp\left(\frac{-V_{bs}}{NJTSSWG \cdot V_{tm0}} \cdot \frac{VTSSWGS}{VTSSWGS - V_{bs}}\right)$$

The denominator on the right-hand side of equation (24) is expressed as equation (25). For example, the CPU 501 calculates RJLG using equations (14) to (25). Equations (14) to (25) may be stored in a storage device that is accessible by the CPU 501 or may be described in the equivalent circuit.

Based on the first junction resistance and the second junction resistance and the connection resistance that are calculated by the calculating unit, the first-coefficient calculating unit 606 calculates a first coefficient that indicates the impact of the first and the second junction resistances in the parallel circuits and the connection resistance that are detected by the detecting unit 601, on amplitude variation.

Based on the first and the second junction capacitances and the connection resistance that are included in the model circuit, the second-coefficient calculating unit 607 calculates a second coefficient that indicates the impact of the first and the second junction capacitances in the parallel circuits and the connection resistance that are detected by the detecting unit 601, on phase variation.

The correcting unit 608 corrects the first junction capacitance and the second junction capacitance using the sum of the first and the second coefficients that are respectively calculated by the first-coefficient and the second-coefficient calculating units 606 and 607.

Equation (26) below expresses an exemplary detailed process executed by the first-coefficient calculating unit 606, the second-coefficient calculating unit 607, and the correcting unit 608.

$$\frac{B_{new}}{2\omega} = \frac{CJG}{\left(1 + \frac{Rdep}{\left(\frac{RJLG}{2}\right)}\right)^2 + \omega^2 \cdot (2CJG)^2 \cdot Rdep^2} \qquad (26)$$

For example, the CPU 501 calculates the susceptance that is ($B_{new}/2\omega$) using equation (26). The susceptance $B_{new}/2\omega$ is the junction capacitance CJG obtained after the correction. The first coefficient is the result of the calculation of $\{1+Rdep/(RJLG/2)\}^2$ in the denominator of equation (26). The second coefficient is the result of the calculation of $\{\omega^2 \cdot (2CJG)^2 \cdot Rdep^2\}$ in the denominator of equation (26).

For example, if the gate length L is long, the connection resistance Rdep is small and the denominator of equation (26) is small. Therefore, if the gate length L becomes longer, the result of the calculation of equation (26) conventionally approaches CJG in equation (4). On the other hand, if the gate length L becomes shorter, the connection resistance Rdep becomes higher and the denominator of equation (26) becomes smaller. Therefore, as indicated by the result of the calculation of equation (26), the capacitance becomes lower than CJG in equation (4) in the conventional case.

Equation (26) is stored in a storage device that is accessible by the CPU 501. Alternatively, equation (26) may be described in the equivalent circuit 400, or may be created by the verification apparatus 600 when the detecting unit 601 has detected the parallel circuit and the connection resistance.

The output unit 609 has a function of outputting the result of the correction. For example, the CPU 501 outputs CJG obtained after the correction. The form of the output may be, for example, display on the display 508, output to the printer 513 for printing, or transmission to an external apparatus using the I/F 509. The result of the correction may also be stored to a storage device such as the RAM 503, the magnetic disk 505, and the optical disk 507.

Derivation of equation (26) will be described in detail with reference to FIGS. 9 and 10.

Figure 9:
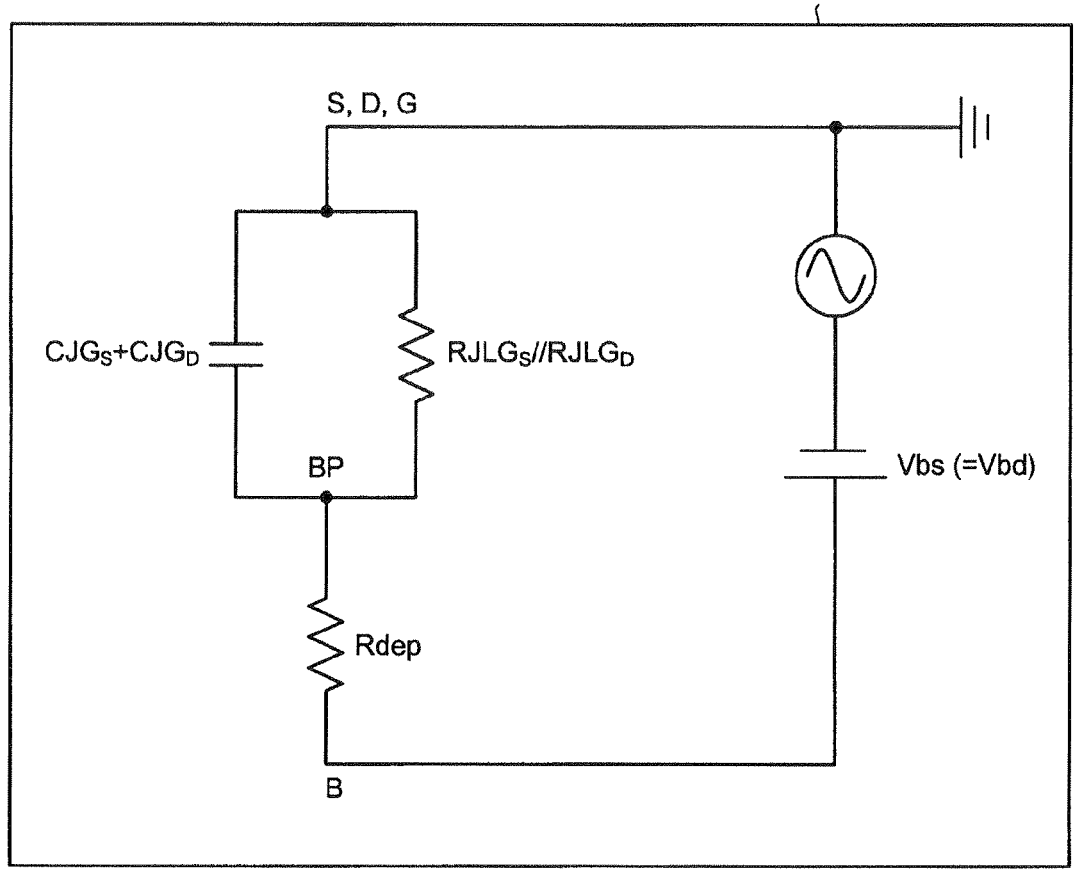
FIG. 9 is a first explanatory diagram of the creation of equation (26).

FIG. 9 is a first explanatory diagram of the creation of equation (26). An equivalent circuit 900 depicts an example of a combination of the junction capacitance and the junction resistance in the parallel circuit. "(CJG$_S$+CJG$_D$)" represents the combination of CJG$_S$ and CJG$_D$. "(RJLG$_S$//RJLG$_D$)" represents the combination of RJLG$_S$ and RJLG$_D$.

Figure 10:
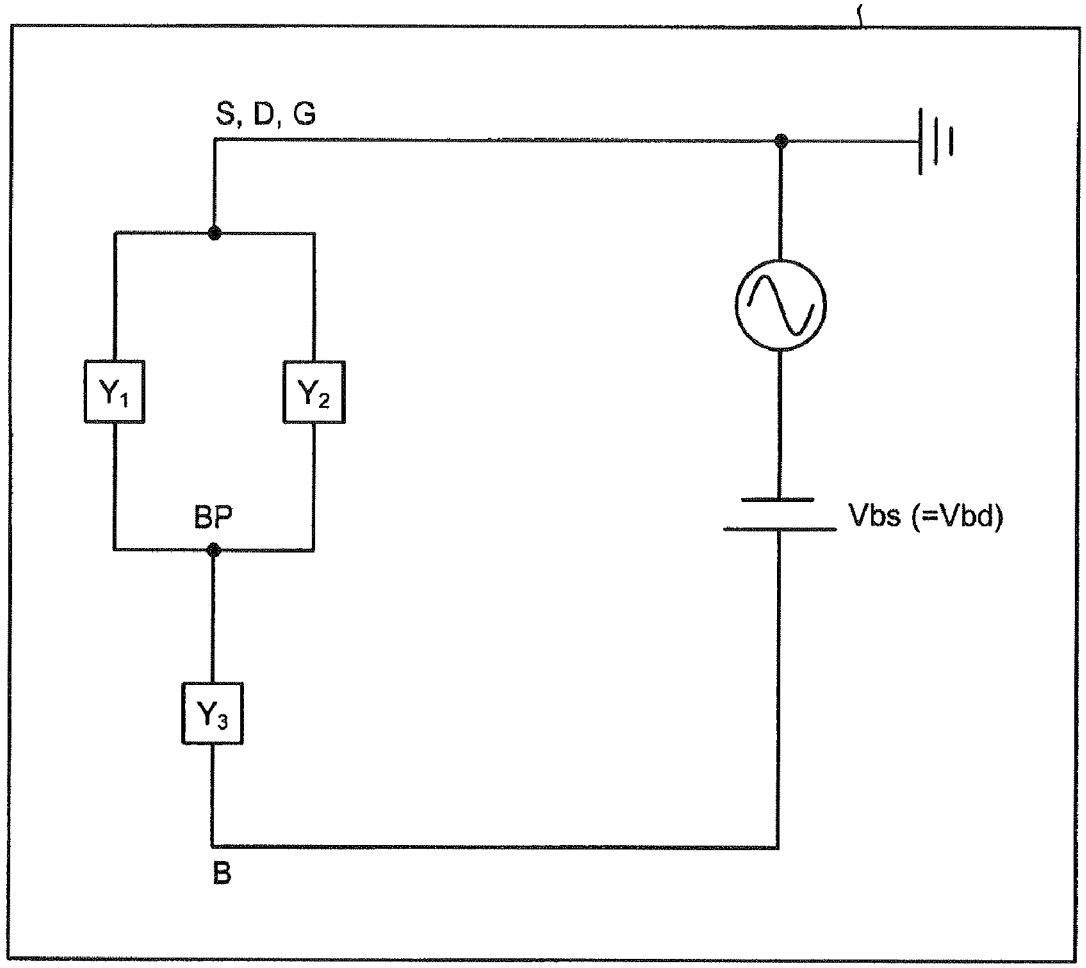
FIG. 10 is a second explanatory diagram of the creation of equation (26).

FIG. 10 is a second explanatory diagram of the creation of equation (26). An equivalent circuit 1000 is an example where each element in the equivalent circuit 900 depicted in FIG. 9 is represented by an admittance. "Y$_1$" is the admittance concerning (CJG$_S$+CJG$_D$). "Y$_2$" is the admittance concerning (RJLG$_S$//RJLG$_D$). "Y$_3$" is the admittance concerning Rdep.

Therefore, Y$_1$ to Y$_3$ are expressed as equations (27) to (29).

$$Y_1 = j \cdot \omega \cdot (CJG_s + CJG_D) \qquad (27)$$

$$Y_2 = \frac{1}{RJLG_s \,//\, RJLG_D} \qquad (28)$$

$$Y_3 = \frac{1}{Rdep} \qquad (29)$$

Based on equations (27) to (29), the admittance of the equivalent circuit 400 is expressed as equation (30).

$$Y_{new} = \qquad (30)$$

$$\frac{1}{\frac{1}{Y_1 + Y_2} + \frac{1}{Y_3}} = \frac{\begin{array}{l}\omega^2 \cdot (CJG_s + CJG_D)^2 \cdot (RJLG_s \,//\, RJLG_D)^2 \cdot \\ Rdep + (RJLG_s \,//\, RJLG_D) + Rdep + \\ j \cdot \omega \cdot (CJG_s + CJG_D) \cdot (RJLG_s \,//\, RJLG_D)^2 \end{array}}{\begin{array}{l}(RJLG_s \,//\, RJLG_D + Rdep)^2 + \omega^2 \cdot \\ (CJG_s + CJG_D)^2 \cdot (RJLG_s \,//\, RJLG_D)^2 \cdot Rdep^2\end{array}}$$

$$Y_{new} = G_{new} + jB_{new} \qquad (31)$$

$$G_{new} = \frac{\begin{array}{l}(RJLG_s \,//\, RJLG_D) + Rdep + \omega^2 \cdot (CJG_s + CJG_D)^2 \cdot \\ (RJLG_s \,//\, RJLG_D)^2 \cdot Rdep\end{array}}{\begin{array}{l}(RJLG_s \,//\, RJLG_D + Rdep)^2 + \omega^2 \cdot (CJG_s + CJG_D)^2 \cdot \\ (RJLG_s \,//\, RJLG_D)^2 \cdot Rdep^2\end{array}} \qquad (32)$$

$$B_{new} = \frac{\omega \cdot (CJG_s + CJG_D)}{\left(1 + \frac{Rdep}{(RJLG_s \,//\, RJLG_D)}\right)^2 + \omega^2 \cdot (CJG_s + CJG_D)^2 \cdot Rdep^2} \qquad (33)$$

The real part of "Y$_{new}$" represents conductance as equation (31) and the imaginary part thereof represents susceptance. Therefore, the conductance G$_{new}$ and the susceptance B$_{new}$ are respectively expressed as equations (32) and (33).

Assuming that the junction capacitances $CJG_S$ and $CJG_D$ are represented by the junction capacitance CJG as described above and the junction resistances $RJLG_S$ and $RJLG_D$ are represented by the junction resistance RJLG as described above, the susceptance $B_{new}$ is expressed as equation (34).

$$B_{new} = \frac{2 \cdot \omega \cdot CJG}{\left(1 + \frac{Rdep}{\left(\frac{RJLG}{2}\right)}\right)^2 + \omega^2 \cdot (2CJG)^2 \cdot Rdep^2} \qquad (34)$$

As described above, in the actual measurement, the susceptance $B/2\omega$ is represented as the junction capacitance CJG. Therefore, equation (26) is created by dividing the right-hand and the left-hand sides of equation (34) by $2\omega$.

The verification apparatus 600 calculates the combined capacitance and the combined resistance, based respectively on the junction capacitances $CJG_S$ and $CJG_D$, and the junction resistances $RJG_S$ and $RJG_D$ in the parallel circuit detected by the detecting unit 601.

The verification apparatus 600 respectively creates the admittance of the combined resistance, the combined capacitance, and the connection resistance, and creates the overall admittance of the equivalent circuit from these admittances.

The verification apparatus 600 creates the conductance and the susceptance from the overall admittance, and creates equation (26) by dividing the susceptance by $2\omega$.

The output unit 609 outputs the result of the creation. For example, the CPU 501 outputs equation (26). The form of the output may be, for example, storage to a storage device such as the RAM 503, the magnetic disk 505, and the optical disk 507.

Figure 11:
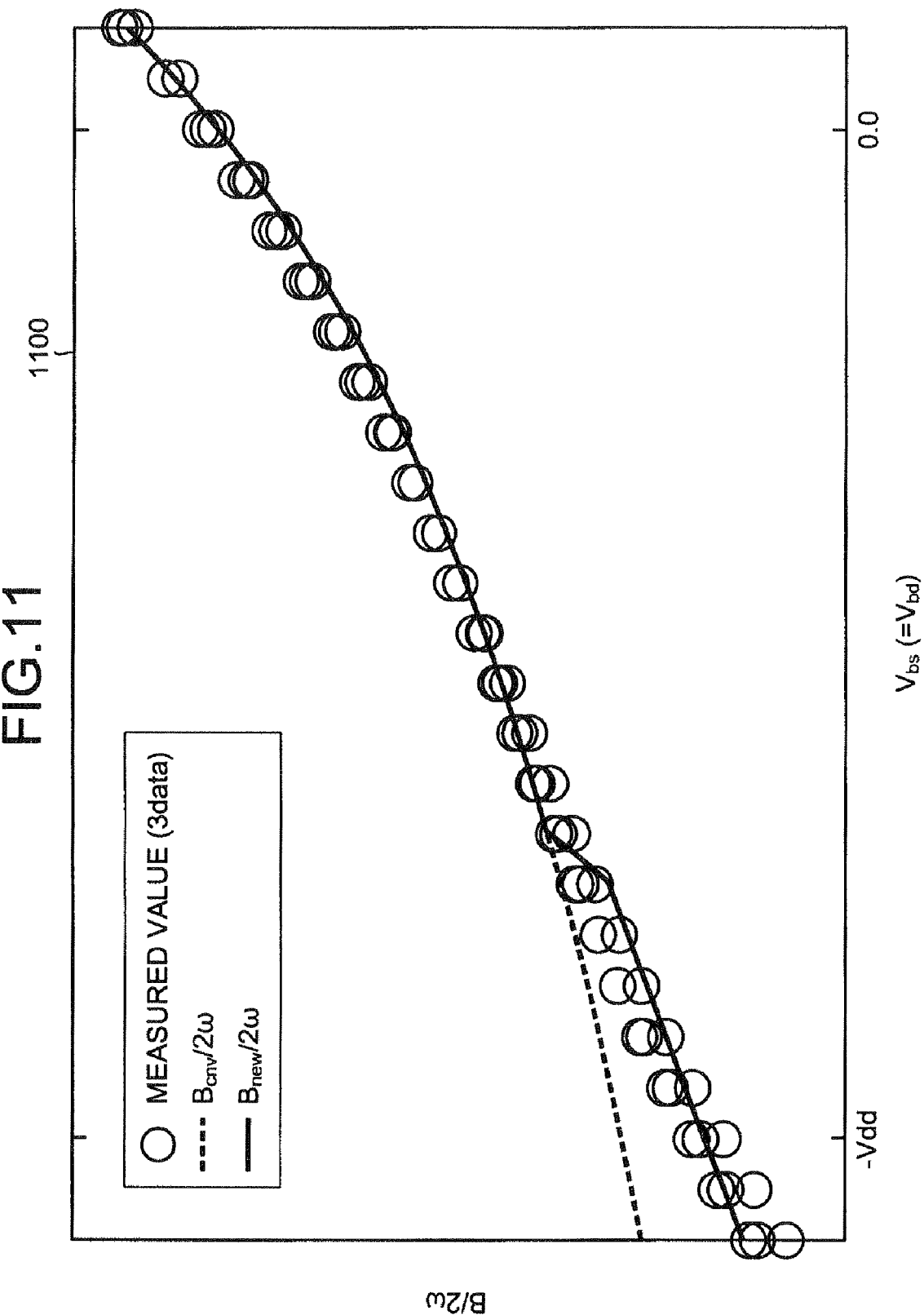
FIG. 11 is an explanatory diagram of an example of a correction result.

FIG. 11 is an explanatory diagram of an example of the result of the correction. A graph 1100 depicts measured values, the susceptance $B_{cnv}/2\omega$ that is the junction capacitance CJG conventionally calculated according to equation (4), and the susceptance $B_{new}/2\omega$ calculated using equation (26). The axis of ordinate represents the susceptance $B/2\omega$ and the axis of abscissa represents $V_{bs}$ (which is also $V_{bd}$). "Vdd" represents the power voltage.

With respect to the measured values, the susceptance $B/2\omega$ decreases if a reverse bias of $V_{bs}$ and $V_{bd}$ is applied, indicating that the junction capacitance CJG is reduced. With respect to the conventional susceptance $B_{cnv}/2\omega$, though the reduction of the junction capacitance CJG due to the reverse biases of $V_{bs}$ and $V_{bd}$ is not demonstrated, with respect to the susceptance $B_{new}/2\omega$ described in the embodiment, the reduction of the junction capacitance CJG is demonstrated.

Figure 12:
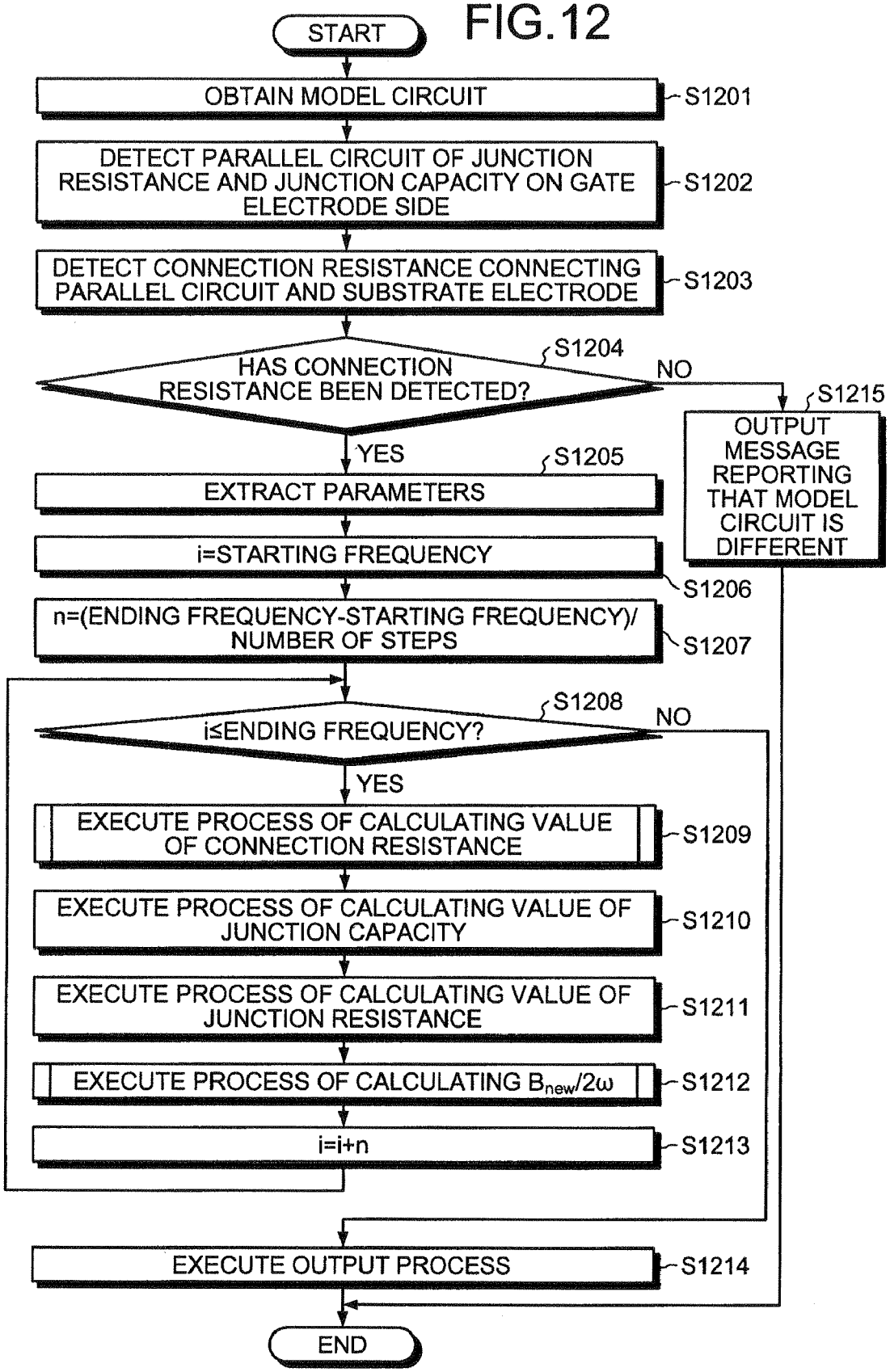
FIG. 12 is a flowchart of an example of the process procedure of verification by the verification apparatus.

FIG. 12 is a flowchart of an example of the process procedure of verification by the verification apparatus 600. The verification apparatus 600 executes AC analysis or transient analysis. The verification apparatus 600 obtains the model circuit (step S1201). From the model circuit obtained, the detecting unit 601 detects the parallel circuit of the junction resistances and the junction capacitances on the gate electrode side (step S1202). The junction resistances and the junction capacitances on the gate electrode side are, for example, the junction resistances $RJLG_S$ and $RJLG_D$ and the junction capacitances $CJG_S$ and $CJG_D$.

Using the detecting unit 601, the verification apparatus 600 detects the connection resistance Rdep that connects the parallel circuit detected and the substrate electrode (step S1203), and determines whether the connection resistance Rdep has been detected (step S1204).

If the verification apparatus 600 determines that the connection resistance Rdep has been detected (step S1204: YES), the extracting unit 602 extracts the parameters from the model circuit (step S1205). The verification apparatus 600 sets i=starting frequency (step S1206) and also sets n=(ending frequency-starting frequency)/the number of steps (step S1207). The parameters are parameters concerning Rdep, RJLG, and CLG, and are defined in the model circuit. The starting frequency, the ending frequency, and the number of steps are defined in advance in the model circuit as the AC analysis and are, for example, extracted by the extracting unit 602 simultaneously with the parameters.

The verification apparatus 600 determines whether i≦ending frequency is true (step S1208). If the verification apparatus 600 determines that i≦ending frequency is true (step S1208: YES), the connection resistance calculating unit 603 executes the process of calculating the connection resistance (step S1209). The verification apparatus 600 executes the process of calculating the junction capacitance using the junction capacitance calculating unit 605 (step S1210).

The verification apparatus 600 executes the process of calculating the junction resistance using the junction resistance calculating unit 604 (step S1211), and executes the process of calculating the susceptance $B_{new}/2\omega$ using the first-coefficient and the second-coefficient calculating units 606 and 607, and the correcting unit 608 (step S1212). The sequence in which the processes of calculating the connection resistance Rdep, the junction capacitance CJG, and the junction resistance RJLG are executed is not particularly limited, and may be executed simultaneously. However, all the results thereof are used in the process of calculating the susceptance $B_{new}/2\omega$.

The verification apparatus 600 sets i=i+n (step S1213) and the procedure returns to step S1208. Flows will be described in detail hereinafter for the connection resistance Rdep and $B_{new}/2\omega$. However, the junction capacitance CJG and the junction resistance RJLG are identical to the conventional arts and therefore, will be omitted.

At step S1208, if the verification apparatus 600 determines that i≦ending frequency is not true (step S1208: NO), the output unit 609 executes an output process (step S1214) and a series of the process steps comes to an end.

At step S1204, if the verification apparatus 600 determines that the connection resistance has not been detected (step S1204: NO), the output unit 609 outputs a message reporting that the model circuit is different (step S1215) and the series of process steps comes to an end.

Figure 13:
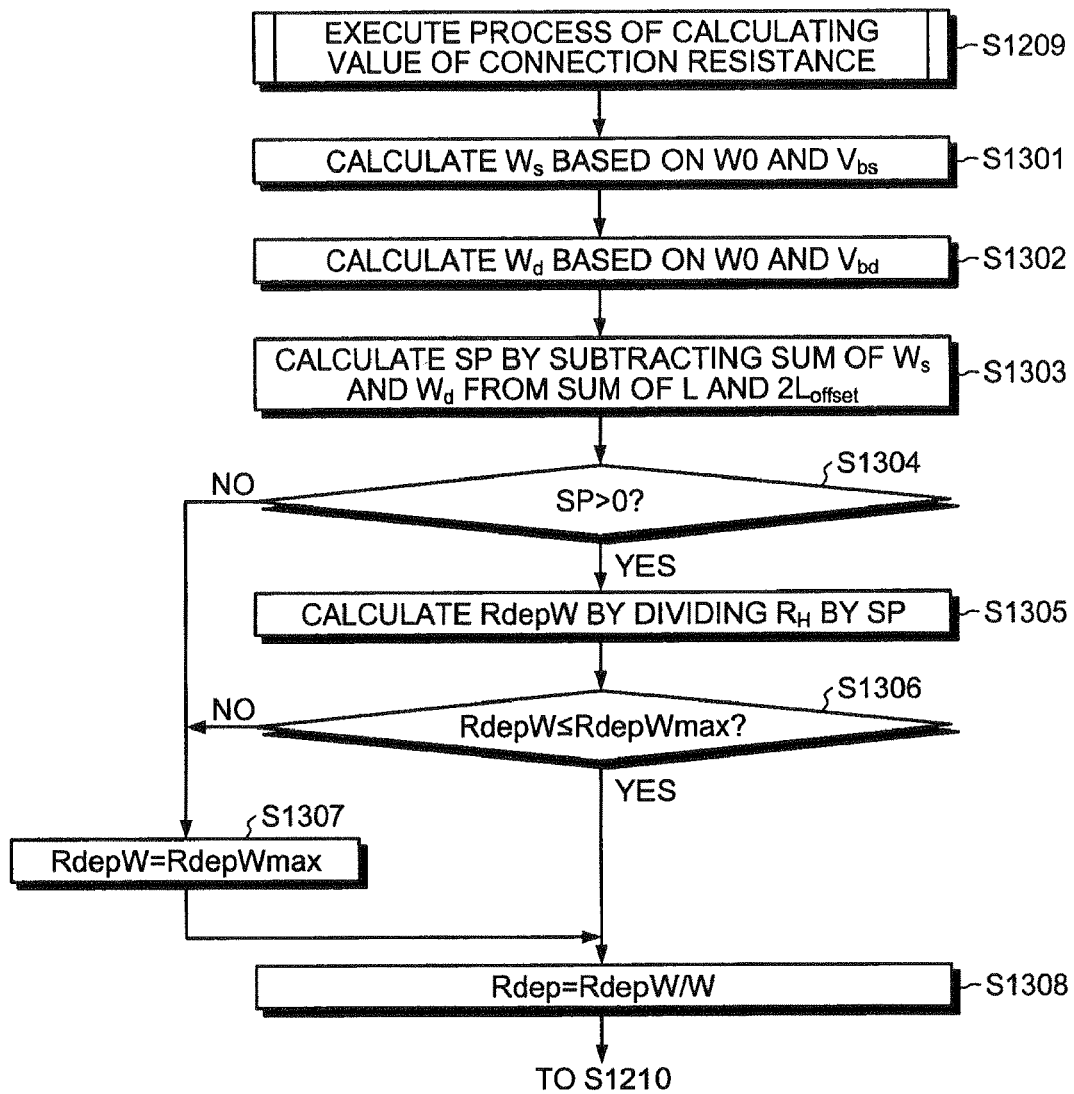
FIG. 13 is a flowchart detailing a process of calculating the connection resistance (step S1209) depicted in FIG. 12.

FIG. 13 is a flowchart detailing the process of calculating the connection resistance (step S1209) depicted in FIG. 12. The verification apparatus 600 calculates $W_s$ based on W0 and $V_{bs}$ using the first-depletion layer width calculating unit 701 (step S1301) and calculates $W_d$ based on W0 and $V_{bd}$ using the second-depletion layer width calculating unit 702 (step S1302). $W_s$ and $W_d$ are calculated according to equations (11) and (12), respectively.

The verification apparatus 600 calculates the third width SP by subtracting the sum of $W_s$ and $W_d$ from the sum of L and $2L_{offset}$, using the region width calculating unit 703 (step S1303). Using the determining unit 704, the verification apparatus 600 determines whether the third width SP is >0 (step S1304). If the third width SP is greater than zero, this indicates that the depletion layers formed immediately beneath the intermediate node 118 do not overlap (for example, FIG. 8). If the third width SP is zero or less, this indicates that the depletion layers formed immediately beneath the intermediate node 118 overlap into each other (for example, FIG. 1).

If the verification apparatus 600 determines that the third width SP is >0 (step S1304: YES), the resistivity calculating unit 705 calculates RdepW by dividing RH by the third width (step S1305).

Using the determining unit 704, the verification apparatus 600 determines whether RdepW≦RdepWmax is true (step S1306). If the verification apparatus 600 determines that the inequality RdepWRdepWmax is true (step S1306: YES), Rdep=RdepW/W is set (step S1308) and the procedure proceeds to step S1210.

On the other hand, if the verification apparatus 600 determines that the third width is not >0 (step S1304: NO) or that RdepW≦RdepWmax is not true (step S1306: NO), the verification apparatus 600 sets RdepW=RdepWmax (step S1307) and the procedure proceeds to step S1308 after step S1307.

Figure 14:
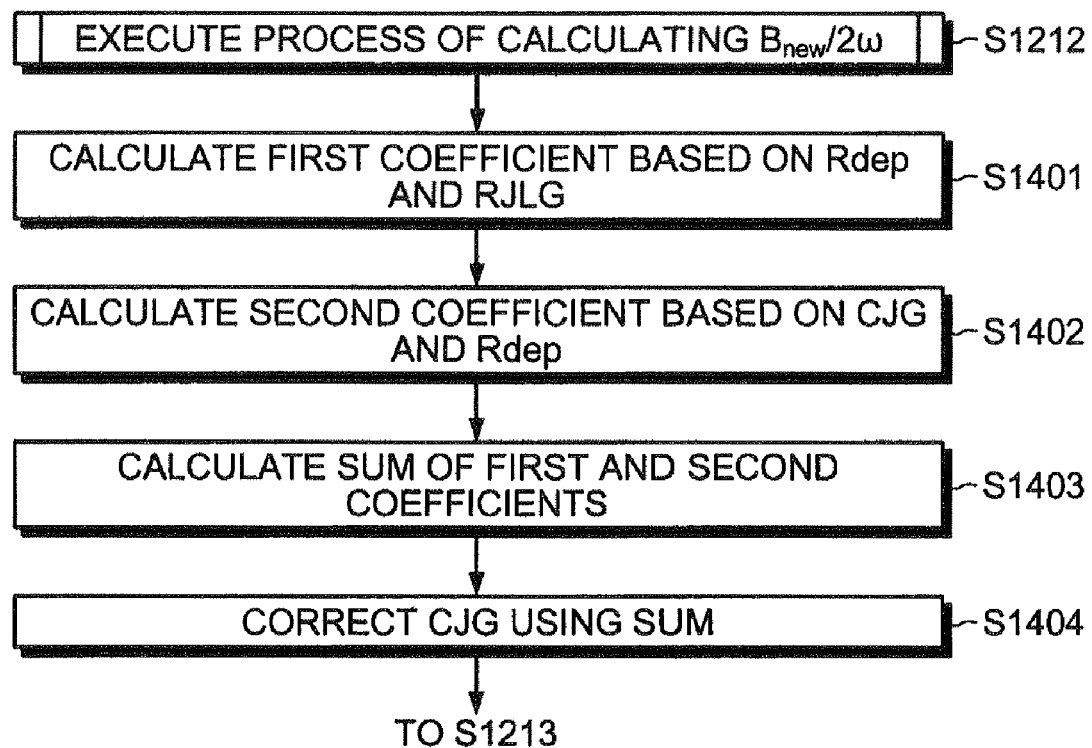
FIG. 14 is a flowchart detailing a process of calculating $B_{new}/2\omega$ (step S1212) depicted in FIG. 12.
Figure 15:
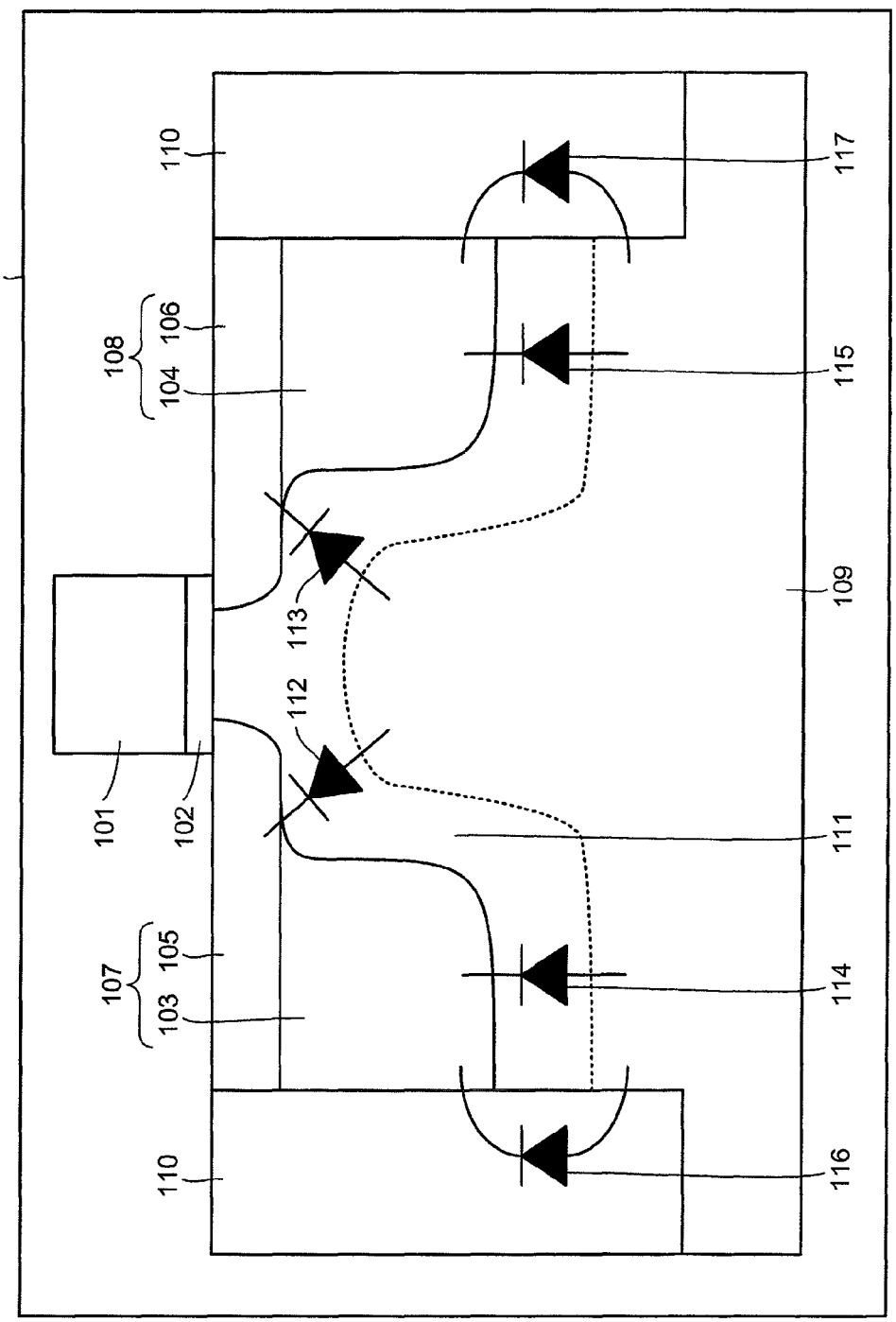
FIG. 15 is an explanatory diagram of an example of a vertical structure of a conventional transistor.

FIG. 14 is a flowchart detailing the process of calculating $B_{new}/2\omega$ depicted in FIG. 12. The verification apparatus 600 calculates the first coefficient based on Rdep and RJLG, using the first-coefficient calculating unit 606 (step S1401) and calculates the second coefficient based on CJG and Rdep, using the second-coefficient calculating unit 607 (step S1402).

The verification apparatus 600 calculates the sum of the first and the second coefficients (step S1403). The correcting unit 608 corrects CJG based on the sum of the first and the second coefficients (step S1404) and the procedure proceeds to step S1213. The result of the correction gives the susceptance $B_{new}/2\omega$ and in practice, this can be obtained using equation (26).

As described above, according to the embodiment, the junction capacitance is corrected using the connection resistance, in the model circuit for a MOSFET, where junction capacitance and junction resistance are connected to the substrate electrode through connection resistance. Thereby, the influence of the depletion layer formed immediately beneath the intermediate node can be replicated and the accuracy of the simulation can be improved.

Therefore, when the current flowing through the junction capacitance on the source side (for example, $CJG_S$) is simulated, not only the influence of the voltage between the source electrode and the substrate electrode but also the influence of the drain potential are taken into consideration. When the current flowing through the junction capacitance on the drain side (for example, $CJG_D$) is simulated, not only the influence of the voltage between the drain electrode and the substrate electrode but also the influence of the source potential are taken into consideration.

The connection resistance is calculated to be small when the gate length is long, and is calculated to be large when the gate length is short, whereby the influence of the depletion layer can be replicated and the accuracy of the simulation can be improved.

The connection resistance is determined based on the width of the depletion layer that expands corresponding to the voltage, whereby the influence of the depletion layer can be replicated and the accuracy of the simulation can be improved.

When the depletion layer formed by the drain region and the substrate and the depletion layer formed by the source region and the substrate overlap each other, the connection resistance is calculated with the resistivity in the region represented by the connection resistance as an upper limit. Thereby, the influence of the small amount of carriers that are present in the depletion layers can be replicated and the accuracy of the simulation can be improved.

By setting the upper limit for the resistivity of the region represented by the connection resistance, the influence of the small amount of carriers that are present in the depletion layers can be replicated and the accuracy of the simulation can be improved.

The verification method described in the present embodiment may be implemented by executing a prepared program on a computer such as a personal computer and a workstation. The program is stored on a non-transitory computer-readable recording medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing therein a verification program that causes a computer to execute a process comprising:
    detecting from a model circuit concerning a field effect transistor:
        a first circuit that represents a junction of a source region and a substrate region and has a first junction resistance and a first junction capacitance,
        a second circuit that is parallel to the first circuit, represents a junction of a drain region and the substrate region, and has a second junction resistance equivalent to the first junction resistance and a second junction capacitance equivalent to the first junction capacitance, and
        a connection resistance that connects the first circuit, the second circuit, and a substrate electrode;
    calculating a first coefficient based on the first and the second junction resistances and the connection resistance, the first coefficient indicating impact of the first and the second junction resistances and the connection resistance on amplitude variation;
    calculating a second coefficient based on the first and the second junction capacitances and the connection resistance, the second coefficient indicating impact of the first and the second junction capacitances and the connection resistance on phase variation;
    correcting the first and the second junction capacitances using a sum of the first and the second coefficients; and
    outputting a result obtained by the correcting.

2. The non-transitory computer-readable recording medium according to claim 1, the process further comprising:
    extracting from the model circuit, if the connection resistance is detected at the detecting:
        a gate length,
        a first length from a first plane that substantially includes an edge portion that is of the source region and faces toward the drain region, to an edge portion that is of a gate electrode and opposes the first plane,
        a second length from a second plane that substantially includes an edge portion that is of the drain region and faces toward the source region, to an edge portion that is of the gate electrode and opposes the second plane, a first width from the first plane, to an edge portion that is of the depletion layer and faces toward the drain region, a second width from the second plane, to an edge portion that is of the depletion layer and faces toward the source region, and a coefficient concerning resistance of the substrate region;

calculating a third width as a width of a region having the connection resistance therein, by subtracting a sum of the first and the second widths, from a sum of the gate length and the first and the second lengths;

calculating resistivity in the region having the connection resistance therein, by dividing the extracted coefficient by the third width; and calculating the connection resistance by dividing the resistivity by gate width, wherein the calculating of the first coefficient is based on the first and the second junction resistances and the calculated connection resistance, and the calculating of the second coefficient is based on the first and the second junction resistances and the calculated connection resistance.

3. The non-transitory computer-readable recording medium according to claim 2, the process further comprising:

calculating the first width based on voltage between a source electrode and the substrate electrode and based on a first initial width of the depletion layer formed when the voltage between the source electrode and the substrate electrode is zero; and calculating the second width based on voltage between a drain electrode and the substrate electrode and based on a second initial width of the depletion layer formed when the voltage between the drain electrode and the substrate electrode is zero, wherein the extracting includes extracting the first initial width, magnitude of the voltage between the source electrode and the substrate electrode, the second initial width, and magnitude of the voltage between the drain electrode and the substrate electrode, the calculating of the first width is based on the extracted first initial width and the extracted magnitude of the voltage between the source electrode and the substrate electrode, the calculating of the second width is based on the extracted second initial width and the extracted magnitude of the voltage between the drain electrode and the substrate electrode, and the calculating of the third width is by subtracting a sum of the calculated first width and the calculated second width from the sum of the gate length, and the first and the second lengths.

4. The non-transitory computer-readable recording medium according to claim 2, the process further comprising:

determining whether the calculated third width is at most zero, wherein the calculating of the connection resistance is by dividing a designated resistivity by the gate width if at the determining, the third width is determined to be zero or less.

5. The non-transitory computer-readable recording medium according to claim 4, wherein the determining includes determining whether the calculated resistivity is larger than the designated resistivity, and the calculating of the connection resistance is by dividing the designated resistivity by the gate width if at the determining, the calculated resistivity is determined to be larger than the designated resistivity.

6. A verification method comprising:

detecting from a model circuit concerning a field effect transistor:

a first circuit that represents a junction of a source region and a substrate region and has a first junction resistance and a first junction capacitance, a second circuit that is parallel to the first circuit, represents a junction of a drain region and the substrate region, and has a second junction resistance equivalent to the first junction resistance and a second junction capacitance equivalent to the first junction capacitance, and a connection resistance that connects the first circuit, the second circuit, and a substrate electrode;

calculating, by using a processor, a first coefficient based on the first and the second junction resistances and the connection resistance, the first coefficient indicating impact of the first and the second junction resistances and the connection resistance on amplitude variation;

calculating, by using a processor, a second coefficient based on the first and the second junction capacitances and the connection resistance, the second coefficient indicating impact of the first and the second junction capacitances and the connection resistance on phase variation;

correcting, by using a processor, the first and the second junction capacitances using a sum of the first and the second coefficients; and outputting a result obtained by the correcting.

7. A verification apparatus comprising:

a detecting unit that from a model circuit concerning a field effect transistor, detects:

a first circuit that represents a junction of a source region and a substrate region and has a first junction resistance and a first junction capacitance, a second circuit that is parallel to the first circuit, represents a junction of a drain region and the substrate region, and has a second junction resistance equivalent to the first junction resistance and a second junction capacitance equivalent to the first junction capacitance, and a connection resistance that connects the first circuit, the second circuit, and a substrate electrode;

a first-coefficient calculating unit that calculates a first coefficient based on the first and the second junction resistances and the connection resistance, the first coefficient indicating impact of the first and the second junction resistances and the connection resistance on amplitude variation;

a second-coefficient calculating unit that calculates a second coefficient based on the first and the second junction capacitances and the connection resistance, the second coefficient indicating impact of the first and the second junction capacitances and the connection resistance on phase variation;

a correcting unit that corrects the first and the second junction capacitances using a sum of the first and the second coefficients; and an output unit that outputs a result obtained by the correcting unit.

* * * * *